United States Patent
Bunescu et al.

(10) Patent No.: US 11,971,783 B1
(45) Date of Patent: Apr. 30, 2024

(54) INFRASTRUCTURE FOR AUTOMATING ROLLOUT OF DATABASE CHANGES

(71) Applicant: Snowflake Inc., Bozeman, MT (US)

(72) Inventors: Vlad Bunescu, Morgan Hill, CA (US); Yan Huang, Bellevue, WA (US); Jaeha Lee, Redmond, WA (US); Shiyu Qu, Bellevue, WA (US); Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/340,528

(22) Filed: Jun. 23, 2023

Related U.S. Application Data

(63) Continuation of application No. 18/060,848, filed on Dec. 1, 2022.

(51) Int. Cl.
  *G06F 11/14* (2006.01)
  *G06F 11/34* (2006.01)
  *G06F 16/21* (2019.01)

(52) U.S. Cl.
  CPC ...... *G06F 11/1433* (2013.01); *G06F 11/3414* (2013.01); *G06F 16/213* (2019.01); *G06F 2201/80* (2013.01)

(58) Field of Classification Search
  CPC ............ G06F 11/1433; G06F 16/213; G06F 11/3414; G06F 2201/80
  See application file for complete search history.

(56) References Cited

U.S. PATENT DOCUMENTS

| | | | | |
|---|---|---|---|---|
| 6,449,623 | B1* | 9/2002 | Bohannon | G06F 11/1471 |
| 6,701,514 | B1* | 3/2004 | Haswell | G06F 11/3664 |
| | | | | 717/124 |
| 8,782,001 | B2* | 7/2014 | Burke | G06F 8/74 |
| | | | | 707/610 |
| 8,909,604 | B1* | 12/2014 | Holenstein | G06F 11/1471 |
| | | | | 707/678 |
| 9,684,570 | B1* | 6/2017 | Wilding | G06F 11/1474 |
| 10,621,064 | B2* | 4/2020 | Gongloor | G06F 11/3452 |
| 10,783,051 | B2* | 9/2020 | Srinivasan | G06F 11/3688 |
| 11,216,446 | B2* | 1/2022 | Dageville | G06F 16/2365 |
| 11,500,755 | B1* | 11/2022 | Plenderleith | G06F 11/3419 |

(Continued)

FOREIGN PATENT DOCUMENTS

| | | | | |
|---|---|---|---|---|
| EP | 3955127 A1 * | 2/2022 | | G06F 16/213 |
| WO | WO-2017131669 A1 * | 8/2017 | | G06F 11/30 |
| WO | WO-2022074659 A1 * | 4/2022 | | G06F 11/3409 |

*Primary Examiner* — Matthew M Kim
*Assistant Examiner* — Indranil Chowdhury
(74) *Attorney, Agent, or Firm* — Schwegman Lundberg & Woessner, P.A.

(57) ABSTRACT

A method includes decoding, by at least one hardware processor, a notification of a changed database code of a database. A query is executed responsive to the notification. The query indicates a data processing command and a data object in the database. A regression in the changed database code is detected based on multiple regression testing operations applied to the data processing command and the data object. Analysis of the regression is performed to detect a rollout parameter of a plurality of rollout parameters as a root cause of the regression. The plurality of rollout parameters are associated with the changed database code. A determination is made on whether to perform a mitigation action for the regression based on the rollout parameter.

30 Claims, 13 Drawing Sheets

(56) References Cited

U.S. PATENT DOCUMENTS

| | | | |
|---|---|---|---|
| 11,874,824 B2* | 1/2024 | Dageville | G06F 16/2365 |
| 2009/0049012 A1* | 2/2009 | Bossman | G06F 16/24549 |
| 2009/0100004 A1* | 4/2009 | Andrei | G06F 16/2453 |
| 2010/0005341 A1* | 1/2010 | Agarwal | G06F 11/3692 |
| | | | 714/38.11 |
| 2010/0114962 A1* | 5/2010 | Ahadian | G06F 16/2365 |
| | | | 707/E17.014 |
| 2011/0208785 A1* | 8/2011 | Burke | G06F 8/00 |
| | | | 707/E17.005 |
| 2013/0080761 A1* | 3/2013 | Garrett | G06F 11/3428 |
| | | | 713/100 |
| 2014/0250085 A1* | 9/2014 | Sorenson | G06F 16/2322 |
| | | | 707/684 |
| 2016/0004621 A1* | 1/2016 | Gongloor | G06F 11/3452 |
| | | | 707/688 |
| 2016/0062876 A1* | 3/2016 | Narayanan | G06N 5/022 |
| | | | 717/124 |
| 2016/0070726 A1* | 3/2016 | Macnicol | G06F 11/0745 |
| | | | 707/691 |
| 2018/0217920 A1* | 8/2018 | Bhojan | G06F 11/3692 |
| 2019/0095470 A1* | 3/2019 | Dundjerski | G06F 11/0793 |
| 2020/0081814 A1* | 3/2020 | Srinivasan | G06F 8/71 |
| 2020/0326957 A1* | 10/2020 | Toal | G06F 11/3409 |
| 2021/0042218 A1* | 2/2021 | Kapusta | G06F 11/3688 |
| 2021/0109848 A1* | 4/2021 | Leon | G06F 11/3688 |
| 2022/0245148 A1* | 8/2022 | Hwang | G06F 11/3419 |
| 2022/0327040 A1* | 10/2022 | Dageville | G06F 11/3082 |
| 2023/0088784 A1* | 3/2023 | Negussie | G06F 11/008 |
| | | | 717/102 |

* cited by examiner

INFRASTRUCTURE FOR AUTOMATING ROLLOUT OF DATABASE CHANGES

PRIORITY CLAIM

This application is a Continuation of U.S. patent application Ser. No. 18/060,848, filed Dec. 1, 2022, the contents of which are incorporated herein by reference in its entirety.

TECHNICAL FIELD

Embodiments of the disclosure relate generally to databases and, more specifically, to infrastructure for automating the rollout of database changes.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Different database storage systems may be used for storing different types of content, such as bibliographic, full text, numeric, and/or image content. Further, in computing, different database systems may be classified according to the organizational approach of the database. There are many different types of databases, including relational databases, distributed databases, cloud databases, object-oriented and others. Secure storage and access of database data may be provided by encrypting and/or storing data in an encrypted form to prevent unauthorized access. In some cases, database functionalities can be changed which can be a time-consuming process.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
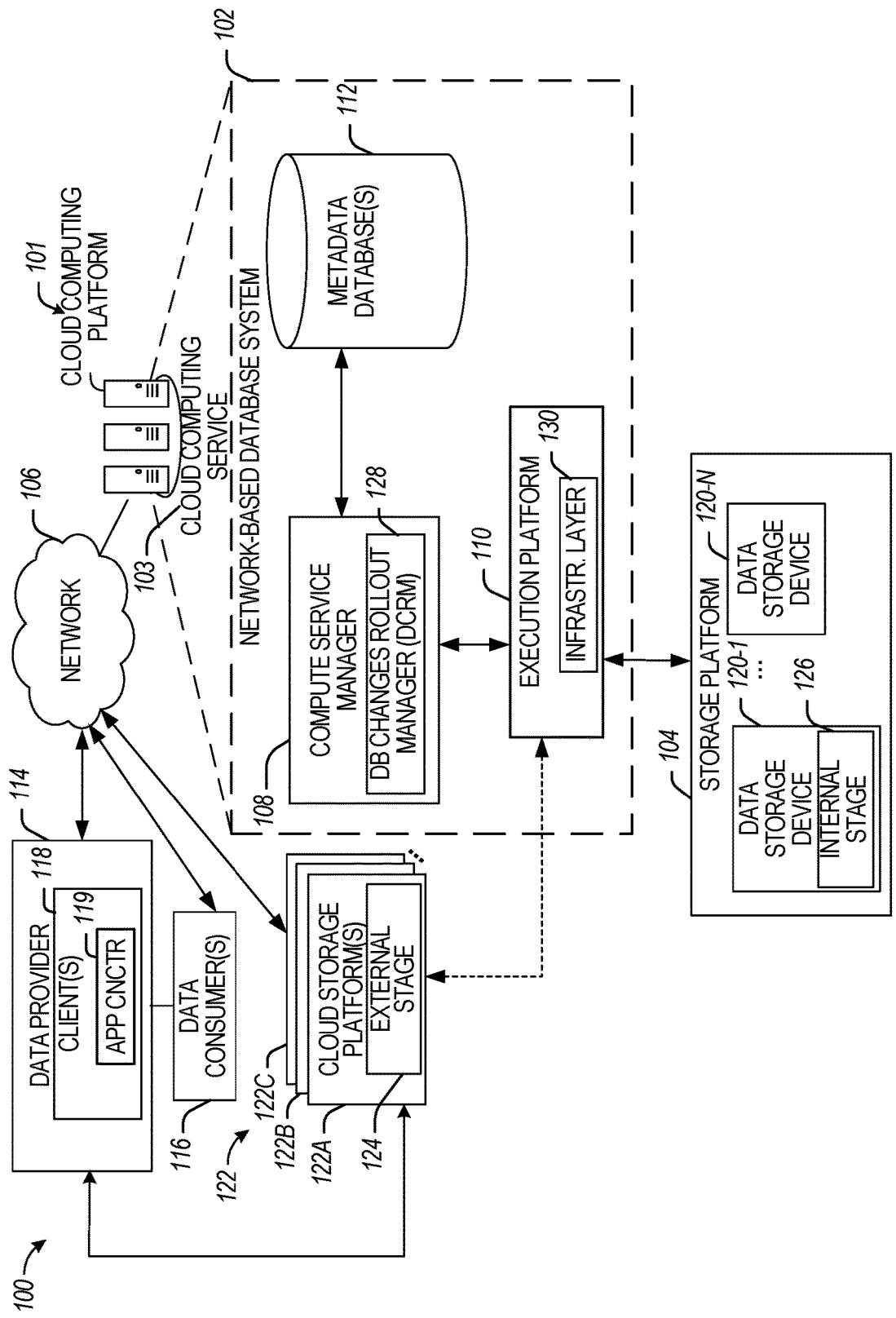
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

As used herein, the term "database change" includes database code changes resulting in performance optimizations, implementing one or more fixes for database-related incidents during query execution, new features, removal or change of existing features, new services, or any other result from the database code change.

Aspects of the present disclosure provide techniques for configuring a rollout automation infrastructure to manage the automated rollout of database changes. In some embodiments, the disclosed techniques are performed by a database changes rollout manager (DCRM), which can use an infrastructure layer of an execution platform to perform functionalities associated with the database changes rollout.

In some embodiments, the disclosed rollout automation infrastructure enables the automated rollout of new changes to database systems. For example, the DCRM can be used to automate manual steps required for safety when rolling out new database changes, which could be time-consuming, ad-hoc, and error-prone. In some aspects, automated steps that can be configured and managed by the disclosed DCRM include monitoring, regression detection, root cause analysis, diagnostics, impact analysis, and making rollback decisions.

The disclosed rollout automation infrastructure provides the following advantages over existing solutions: significantly reduced overhead for developers during the rollout process compared to manual rollouts; provides a safer, more standardized, and less error-prone way of rolling out changes; enables a faster rollout process since all decision making and verifications are automated instead of waiting on human inputs; enables more changes to be rolled out within the same period to avoid backlogs and minimize the discrepancies of behaviors in the system; and leverages features specific to a cloud-based database system to enhance capabilities of individual rollout components.

The disclosed techniques can be used to provide an end-to-end solution aimed at configuring and managing the rollout automation of database changes, and all components can be configured using the disclosed DCRM which facilitates database system integration. In some aspects, the disclosed infrastructure layer is a shared infrastructure layer used to avoid duplication and discrepancies, which improves reusability and ensures all components have the same source of truth. In some embodiments, the DCRM can include extensible components for rollout automation functionality to continuously incorporate new rules and updated configurations. In some aspects, the infrastructure layer is integrated as part of the database system itself (e.g., as part of the execution platform as seen in FIG. 1), as opposed to a set of tools that are invoked outside of the database system.

The various embodiments that are described herein are described with reference where appropriate to one or more of the various figures. An example computing environment using a DCRM with an infrastructure layer used in connection with the automated rollout of database changes is discussed in connection with FIGS. 1-3. Example configuration and functions associated with the DCRM are discussed in connection with FIGS. 4-12. A more detailed discussion of example computing devices that may be used in connection with the disclosed techniques is provided in connection with FIG. 13.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, storage platforms 104, and cloud storage platforms 122 (which can include cloud storage platforms 122A, 122B, . . . , 122C). The cloud computing platform 101 provides computing resources and storage resources that may be acquired (purchased) or leased (e.g., by data providers and data consumers), and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the MT-related functions described herein). The cloud computing platform 101 may include a three-tier architecture: data storage (e.g., storage platforms 104 and 122), an execution platform 110, and a compute service manager 108 providing cloud services (e.g., services associated with the automated rollout of database changes as configured and executed by the DCRM 128).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files (e.g., unstructured data files) that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the network-based database system. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files. Additionally, data stored in internal stages (e.g., internal stage 126) can be managed by the network-based database system, and data stored in external stages (e.g., external stage 124) can be managed by an account of a data provider (e.g., data provider 114).

As shown, the network-based database system 102 of the cloud computing platform 101 is in communication with the cloud storage platforms 104 and 122 (e.g., AWS®, Microsoft Azure Blob Storage®, or Google Cloud Storage), client devices (or clients) 118 of a data provider 114, and clients of a data consumer 116 (also referred to as user 116) via network 106. The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed unstructured data sharing functions) to multiple client accounts, including an account of the data provider 114 associated with client devices 118 (also referred to as a client device 118) and an account of the data consumer 116. In some embodiments, the compute service manager 108 comprises the database changes rollout manager (DCRM) 128 which can be used in connection with functions discussed herein related to the automated rollout of database changes. In some embodiments, automated steps that can be configured and managed by DCRM 128 include monitoring, regression detection, root cause analysis, diagnostics, impact analysis, and making rollback decisions. In some embodiments, DCRM can configure and use functionalities provided by an infrastructure layer 130 configured at one or more execution nodes of the execution platform 110. A more detailed description of the functions provided by DCRM 128 and the infrastructure layer 130 is provided in connection with FIGS. 4-12.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 118. The client device 118 corresponds to a user of one of the multiple client accounts (e.g., a data provider 114) supported by the network-based database system 102. The data provider may utilize application connector 119 at the client device 118 to submit data storage, retrieval, and analysis requests to the compute service manager 108 as well as to access or configure other services provided by the compute service manager 108 (e.g., services associated with the disclosed unstructured data sharing functions).

Client device 118 (also referred to as user device 118) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 118 operated by such users. For example, a notification to a user may be understood to be a notification transmitted to client device 118, input or instruction from a user may be understood to be received by way of the client device 118, and interaction with an interface by a user shall be understood to be interaction with the interface on the client device 118. In addition, database operations (joining, aggregating, analysis, etc.) ascribed to a user (consumer or provider) shall be understood to include performing such actions by the cloud computing service 103 in response to an instruction from that user.

In some aspects, a data consumer 116 can communicate with the client device 118 to access functions offered by the data provider 114. Additionally, the data consumer can access functions offered by the network-based database system 102 via network 106.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of processed data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3TM storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks, such as network 106. These data communication networks may utilize any communication protocol and any type of communication medium. In some embodiments, the data communication networks are a combination of two or more data communication networks (or sub-Networks) coupled with one another. In alternative embodiments, these communication links are implemented using any type of communication medium and any communication protocol.

The compute service manager 108, metadata database 112, execution platform 110, and storage platform 104, are shown in FIG. 1 as individual discrete components. However, each of the compute service manager 108, metadata database 112, execution platform 110, and storage platforms 104 and 122 may be implemented as a distributed system (e.g., distributed across multiple systems/platforms at multiple geographic locations). Additionally, each of the compute service manager 108, metadata database(s) 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 processes the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
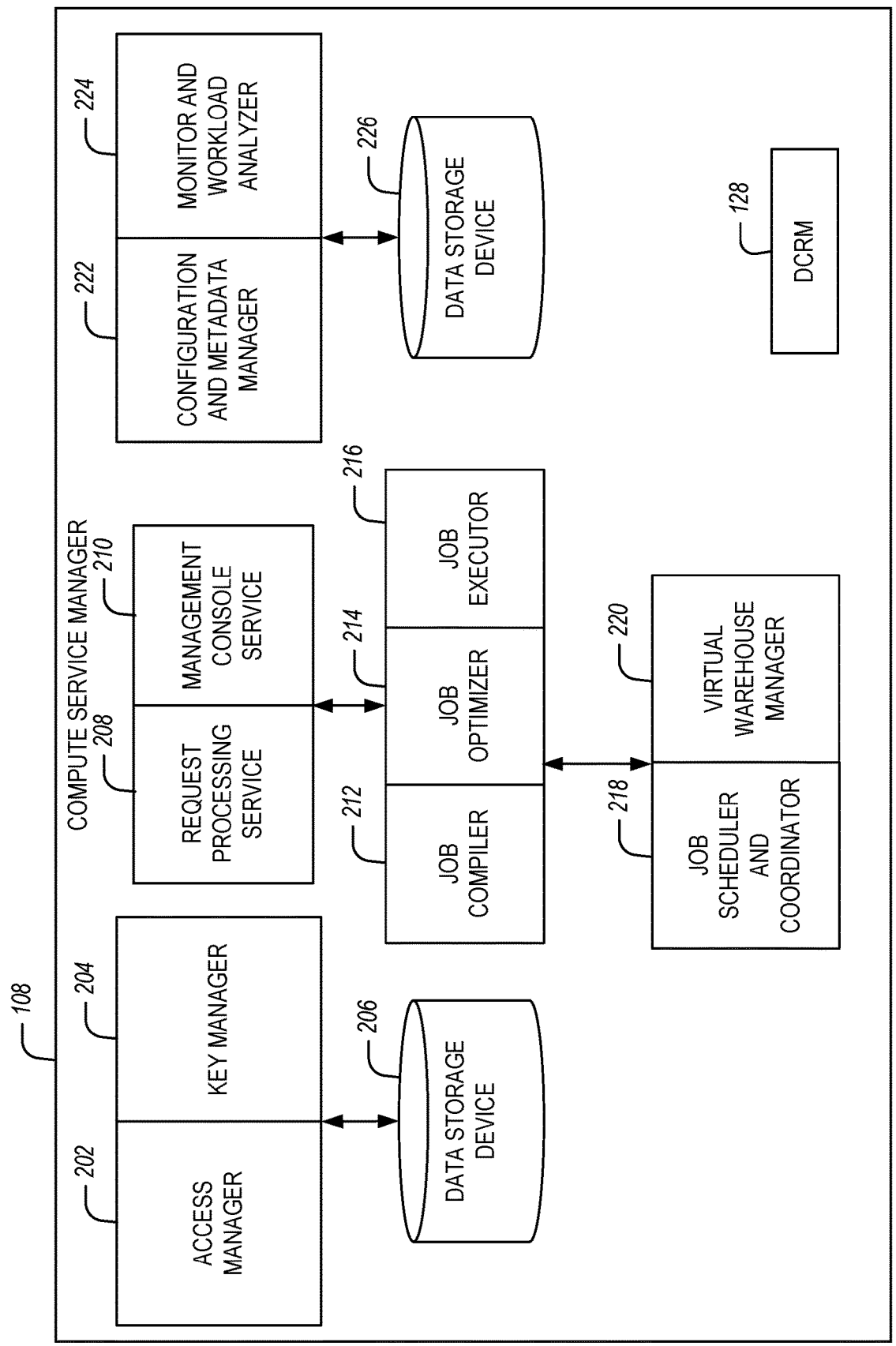
FIG. 2 is a block diagram illustrating the components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in the execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

In some embodiments, the compute service manager 108 further includes the DCRM 128 which can be used in connection with automating the rollout of database changes.

Figure 3:
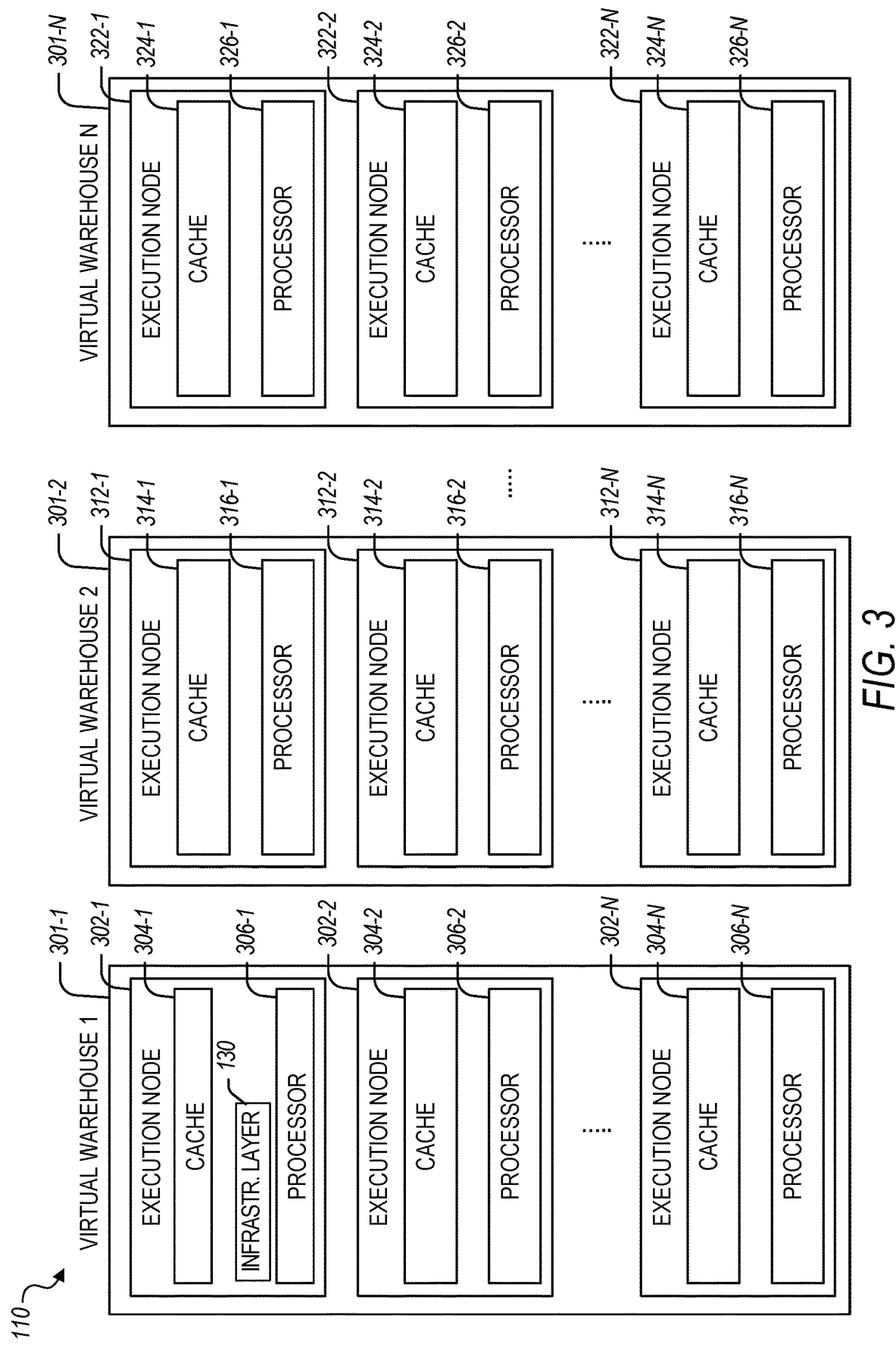
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless concerning the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , and N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some embodiments, one or more of the execution nodes in the execution platform 110 (e.g., execution node 302-1) can be configured to perform functionalities of the infrastructure layer 130.

In some aspects, the disclosed techniques for automating the rollout of database changes can be used to reduce rollout overhead for developers (e.g., developers can spend minimum bandwidth on rollouts, ensure rollouts can keep up with the rate of new changes, and reduce/finish rollout existing number of drifting parameters). The DCRM 128 can further provide automated rollout, rollback, and mitigation functionalities as discussed herein. The DCRM 128 can be further configured to automatically determine the schedule and scope of each stage of the rollout, as well as automatically check for the rollout status, detect issues, and decide on whether to perform a rollback, mitigate, or roll forward. In this regard, the DCRM 128 configures the rollout functionalities to be more responsive to regressions, resulting in safer and more standardized rollout workflows, with manual processing reserved for significant feature updates (e.g., features that go through private or public preview before a release). The DCRM 128 is further configured to automate regression detection, impact analysis, root cause, and diagnostics.

Figure 4:
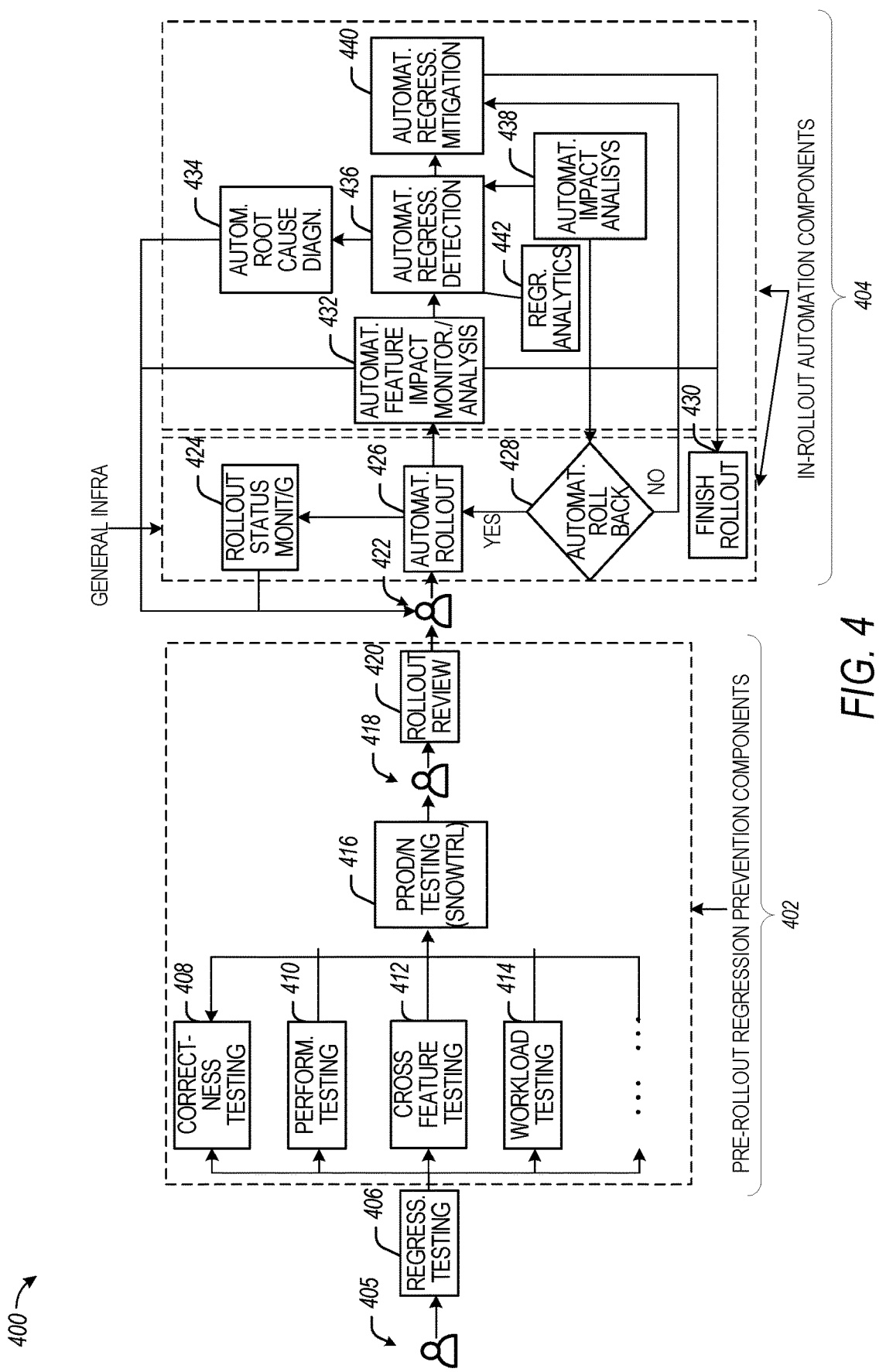
FIG. 4 is a block diagram of an automated rollout infrastructure for automating the rollout of database changes using a database changes rollout manager (DCRM), in accordance with some embodiments of the present disclosure.

FIG. 4 is a block diagram of an automated rollout infrastructure 400 for automating the rollout of database changes using a DCRM, in accordance with some embodiments of the present disclosure. Referring to FIG. 4, the automated rollout infrastructure 400 includes pre-rollout regression prevention components 402 and regression monitoring and in-rollout automation components 404. In some embodiments, the pre-rollout regression prevention components 402 include testing stages used by developer 405 in connection with performing regression testing 406 before rolling out the database change. For example, the pre-rollout regression prevention components 402 include correctness testing 408, performance testing 410, cross-feature testing 412, and workload testing 414. Other types of testing of the database change can be used as well. The pre-rollout regression prevention components 402 further includes production testing 416, which can be followed by a rollout review 420 (e.g., blast radius and issue severity prediction) performed by developer 418.

Functionalities of the in-rollout automation components 404 can be initiated automatically after the rollout review 420 or by developer 422. The in-rollout automation components 404 includes suitable circuitry, interfaces, and/or code configured to perform the following functionalities associated with the automated rollout of database changes: rollout status monitoring 424, automated rollout 426, automatic rollback 428, rollout completion 430 (or finish rollout), automatic feature impact monitoring and analysis 432, automatic regression detection 436, automatic root cause diagnosis 434, automatic impact analysis 438, automatic regression mitigation 440, and regression analytics 442.

In some embodiments, one or more of the rollout status monitoring 424 (e.g., to monitor rollout status of multiple database changes to at least one database), automated rollout 426, automatic rollback 428, and rollout completion 430 functionalities (or components) can be part of the infrastructure layer 130. In some embodiments, one or more of the automatic feature impact monitoring and analysis 432, automatic regression detection 436, automatic root cause diagnosis 434, automatic impact analysis 438, automatic regression mitigation 440, and regression analytics 442 functionalities (or components) can be performed by the DCRM 128.

In some aspects, the automated rollout 426 component is configured to provide parameter orchestration. This is a central component that can be configured to control the schedule and scope for all parameter settings during the database change rollout. The automated rollout 426 can be configured to perform automated parameter rollout/rollback.

In some aspects, the automatic feature impact monitoring and analysis 432 component is configured as a rollout monitoring utility for monitoring the status and impact of parameter rollouts. In some aspects, this component can monitor potential issues correlated with parameter rollouts, including monitoring the processing speed of query execution or other processing, incident surge monitoring, etc.

In some aspects, the automatic regression detection 436 component is configured to perform regression detection to detect regressions in production. This component can communicate with the regression analytics 442 component which provides analytics on detected regressions.

In some aspects, the automatic root cause diagnosis 434 component provides regression diagnostics and determines the root cause of detected regressions. This component can also collect diagnostics information.

In some aspects, the automatic regression mitigation 440 component can be configured as a regression mitigation infrastructure for mitigating regressions in production to avoid impacting users of the database system. Example mitigation can include a rollback of one or more features associated with the database change.

In some aspects, the automatic impact analysis 438 component provides impact analysis by analyzing the blast radius and severity of detected regressions (e.g., how many queries are affected by the regression). This component can be further configured to make rollback, pause, or other mitigation decisions.

Production testing 416 (which is part of the pre-rollout regression prevention components 402) provides automated production testing (e.g., automatically conducts testing for features under rollout and conducts testing periodically on new target queries that would be impacted by the change).

Even though FIG. 4 illustrates the in-rollout automation components 404 including separate functionalities performed by separate components, the disclosure is not limited in this regard, and one or more of these functionalities can be consolidated and performed by at least one component (e.g., the DCRM 128 and/or the infrastructure layer 130).

Figure 5:
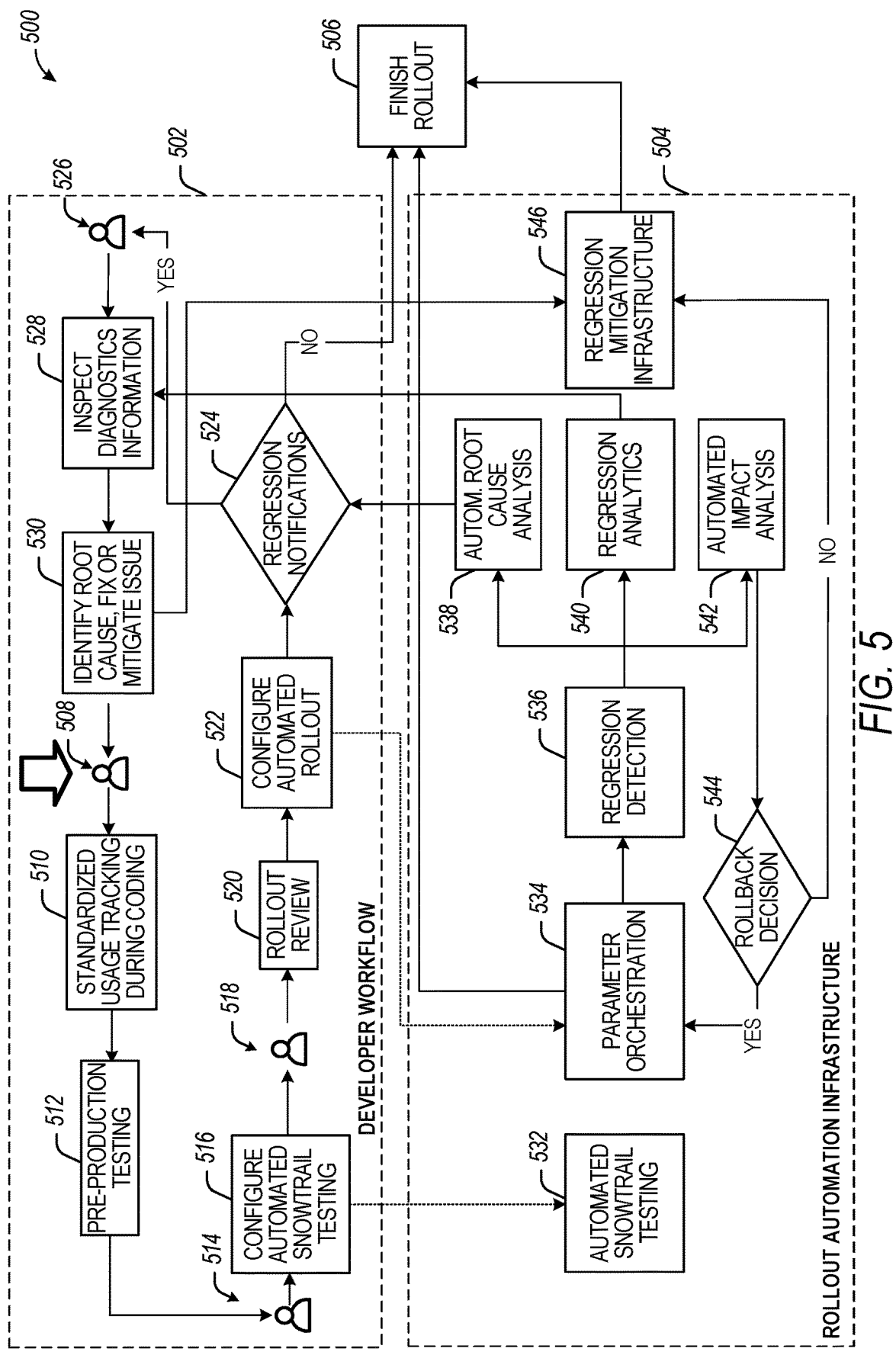
FIG. 5 is a block diagram of an example of automated developer workflow for the rollout of database changes using a DCRM, in accordance with some embodiments of the present disclosure.

FIG. 5 is a block diagram of an example of automated developer workflow for the rollout of database changes using a DCRM, in accordance with some embodiments of the present disclosure. Referring to FIG. 5, the automated workflow 500 includes a developer workflow 502 and a rollout automation infrastructure 504 (which can include functionalities of the pre-rollout regression prevention components 402 and the in-rollout automation components 404 of FIG. 4).

In operation, developer 508 makes database code changes and performs standardized usage tracking during coding 510, followed by pre-production testing 512. Developer 514 follows with automated testing 516 using the automated testing component 532 of the rollout automation infrastructure 504. Developer 518 follows with rollout review 520 followed by configuring automated rollout 522 of the database change. The configuration of the automated rollout 522 uses parameter orchestration 534 functionality of the rollout automation infrastructure 504.

Processing then continues at the rollout automation infrastructure 504, which can include regression detection 536. When a regression is detected, automatic root cause analysis 538 is performed, which can communicate the detected root cause to the regression notification component 524. The regression analytics 540 component collects analytics/information regarding the regression, which information is sent to the developer workflow 502 to perform inspecting diagnostic information 528 (e.g., by developer 526). The developer can further perform analysis to manually identify a root cause, fix, or mitigate the issue (e.g., at functionality 530). Any root cause or mitigation information obtained in the developer workflow can be communicated to the regression mitigation infrastructure 546 for further analysis and consideration in the rollout automation infrastructure.

The automated impact analysis 542 component provides information regarding the impact of the detected regression to the rollback decision 544 component, which determines whether to perform a rollback (processing then resumes at parameter orchestration 534) or not perform a rollback (which decision is communicated to the regression and mitigation infrastructure 546 component). The regression and mitigation infrastructure 546 component can perform additional mitigating actions and complete the rollout (e.g., finish rollout 506 component).

Figure 6:
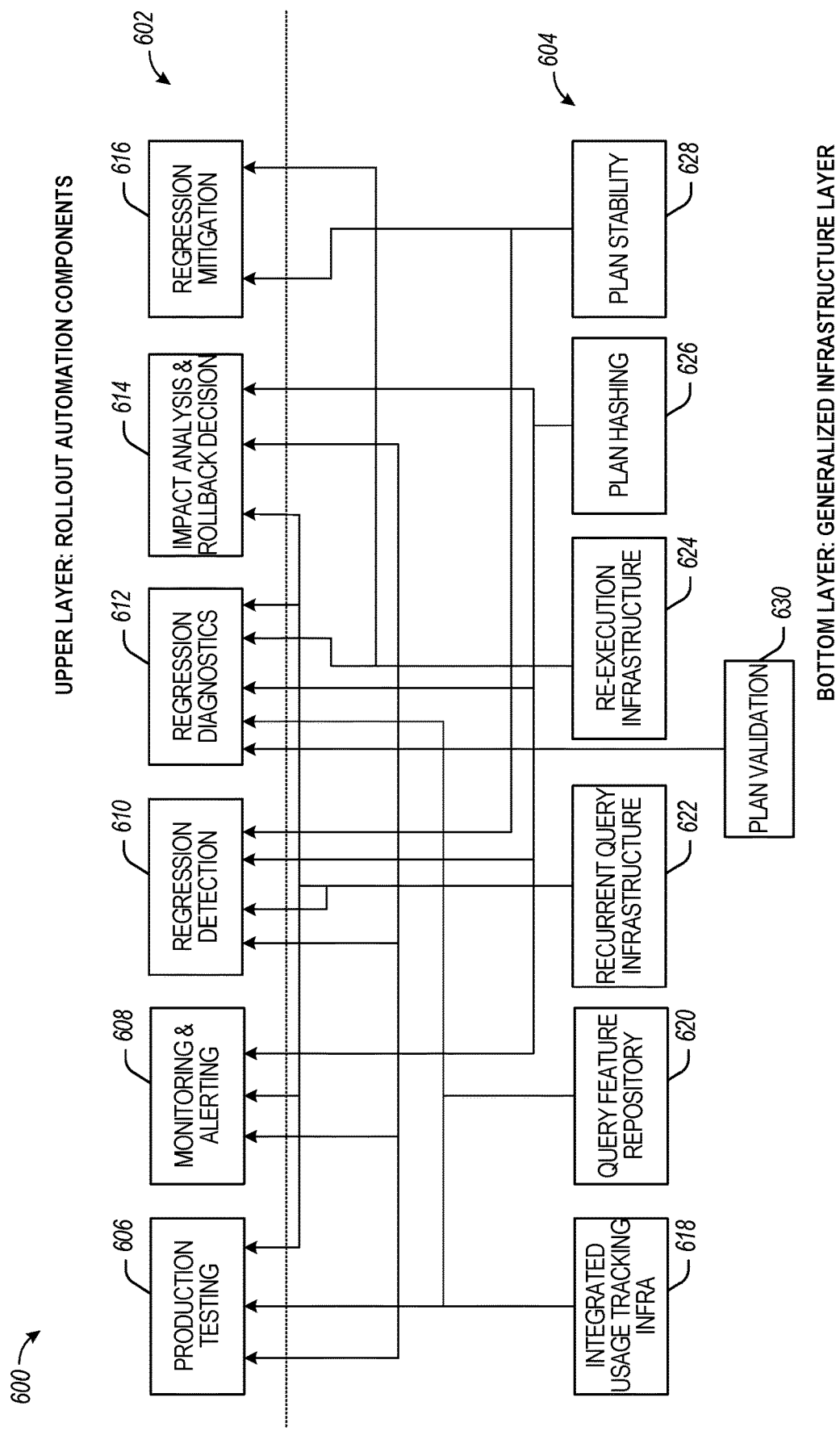
FIG. 6 is a block diagram of an example architecture including a generalized infrastructure layer and rollout automation components used in connection with the rollout of database changes, in accordance with some embodiments of the present disclosure.

FIG. 6 is a block diagram of an example architecture 600 including a generalized infrastructure layer and rollout automation components used in connection with the rollout of database changes, in accordance with some embodiments of the present disclosure. Referring to FIG. 6, the upper layer 602 components include rollout automation components such as production testing 606, monitoring and alerting 608, regression detection 610, regression diagnostics 612, impact analysis and rollback decision 614, and regression mitigation 616. Bottom layer 604 components include generalized infrastructure layer components such as integrated usage tracking infra 618, query feature repository 620, recurrent query infrastructure 622, re-execution infrastructure 624, plan hashing 626, plan stability 628, and plan validation 630. The arrows in FIG. 6 illustrate the architectural layering of components, where components in the upper component layer share the bottom infrastructure layer.

Even though the upper layer 602 components and some bottom layer 604 components are described above in reference to FIGS. 4-5, a more detailed description is also provided herein below in reference to FIGS. 6-12.

In some embodiments, the bottom layer 604 forms a shared infrastructure between multiple components, which is used during database change rollout to avoid duplication and discrepancies, provide a source of truth, and enable leveraging improvements to the same infrastructure. The bottom layer 604 can include pre-defined APIs for general use beyond rollout automation and end-to-end ownership of underlying data sources and transformation pipelines (where the pipelines' health is continuously monitored).

In some embodiments, the DCRM 128 is configured to perform regression detection (e.g., 536 and 610) to detect different types of regressions with different severity and tolerance. Example regression types include data corruption, wrong result, incidents, new user errors, performance regressions, and workload regressions. In this regard, the DCRM 128 can use different detection mechanisms such as database testing (e.g., to detect wrong results), online detection (e.g., using retry in various layers of the system, canary queries and workloads, etc.), and offline detection (e.g., to detect using recurrent query infra, aggregated stats at multiple levels, etc.). In some aspects, DCRM 128 is configured to perform regression detection at different scopes (e.g., individual query level, object (table) level, recurrent query level, workload level, and system level). In some aspects, DCRM 128 is configured to use different detection latency (e.g., regression detection latency can range from immediate to many hours/days as certain types of changes cannot be rolled out quickly even in a fully automated system).

In some embodiments, DCRM 128 is configured to perform regression detection of type data corruption using the following parameters: analysis scope (e.g., table and single query), detection mechanisms (e.g., online and offline corruption prevention infra), detection latency (e.g., low to high), metrics (e.g., consistency checker failures), and root cause analysis (e.g., manual).

In some embodiments, DCRM 128 is configured to perform regression detection of type wrong result using the following parameters: analysis scope (e.g., single query), detection mechanisms (e.g., query testing), detection latency (e.g., high), metrics, and root cause analysis.

In some embodiments, DCRM 128 is configured to perform regression detection of type internal incidents and query failures using the following parameters: analysis scope (e.g., single query and recurrent query), detection mechanisms (e.g., retry mechanisms in various layers, recurrent query infra, and volume-based analysis), detection latency (e.g., low to high), metrics (e.g., incident count), and root cause analysis (e.g., parameter usage, feature tracking, and re-execution infra).

In some embodiments, DCRM 128 is configured to perform regression detection of type user errors using the following parameters: analysis scope (e.g., single query and recurrent query), detection mechanisms (e.g., same as above), detection latency (e.g., low to high), metrics (e.g., error count), and root cause analysis (e.g., same as above).

In some embodiments, DCRM 128 is configured to perform regression detection of type performance regressions using the following parameters: analysis scope (e.g., recurrent query, workload, system), detection mechanisms (e.g., performance canary, recurrent query infra, aggregated stats analysis, workload monitoring), detection latency (e.g., medium to high), metrics (e.g., latency, general performance metrics (I/O, CPU, etc.), specific performance metrics), and root cause analysis (e.g., need holistic performance root cause analysis).

In some embodiments, DCRM 128 is configured to perform regression detection of type workload feature regressions using the following parameters: analysis scope (e.g., recurrent query, workload, system), detection mechanisms (e.g., aggregated stats analysis, workload monitoring), detection latency (e.g., high), metrics (e.g., cost, service metrics, feature specific metrics), and root cause analysis (e.g., need holistic performance root cause analysis).

In some embodiments, the integrated usage tracking infra 618 can be used by the production testing 606 and the monitoring and alerting 608. The integrated usage tracking infra 618 can be configured for integrating parameters with the usage tracking infrastructure to provide a standard way of tracking the usage of new parameters. The benefits of this functionality include clean code and consistent output, automated periodic testing (increased efficiency of testing), a unified dashboard for rollout monitoring, and integration with other rollout automation components (e.g., regression detection and correlation analysis as well as impact analysis to determine blast radius).

In some aspects, the integrated usage tracking infra 618 can be configured as a new type of parameter (e.g., AutomatedRolloutParameter) associated with standardized APIs for integrating with the rollout automation workflow (e.g., markApplicable( ) markApplied( )). In some aspects, the integrated usage tracking infra 618 can be automatically added for AutomatedRolloutParameters. In some aspects, the integrated usage tracking infra 618 enables automated testing for target queries of rollouts in production. In some aspects, the integrated usage tracking infra 618 is integrated with rollout automation components and with regression detection.

In some aspects, the AutomatedRolloutParameter usage is based on the following configurations: possible values (e.g., 'disable', 'track', 'prerelease', 'enable'), feature (e.g., name of the parameter), usage tracking message (e.g., either 'Applicable' or 'Applied'), and introduces a unified behavior to automatically detect new parameters (e.g., parameter_definitions_etl_v, usage_tracking_v).

In some embodiments, the following integrated usage tracking workflow can be configured:
    (a) Make a code change;
    (b) Guard the change with AutomatedRolloutParameter;
    (c) Merge the change;
    (d) Track the release status using the dashboard (value>=track);

(e) Activate automated query testing (value>=prerelease);

(f) Perform a rollout review; and (g) Monitor the database change rollout.

In some embodiments, the query feature repository 620 is in communication with production testing 606 and is configured to extract information about used "features" from queries (e.g., query properties, optimizations, and rollout parameters). This functionality can be implemented with the source of information as the usage tracking infrastructure and can be configured to build and store a feature vector for each query. Example usage of this functionality is for rollout automation and for testing various combinations of features, as well as for ML-based query and workload analysis.

Figure 7:
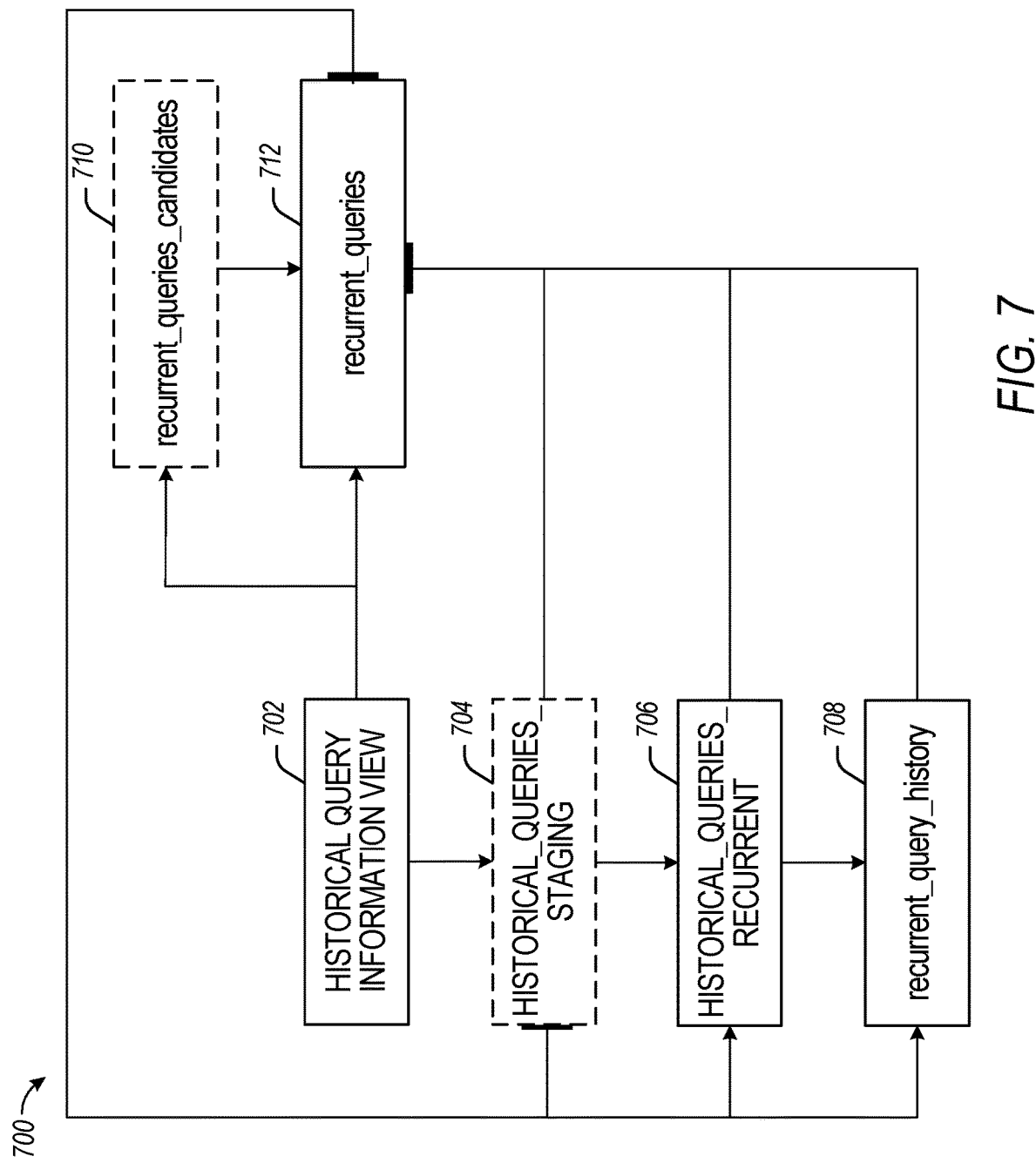
FIG. 7 is a block diagram illustrating known recurrent queries data processing in connection with the rollout of database changes, in accordance with some embodiments of the present disclosure.
Figure 10:
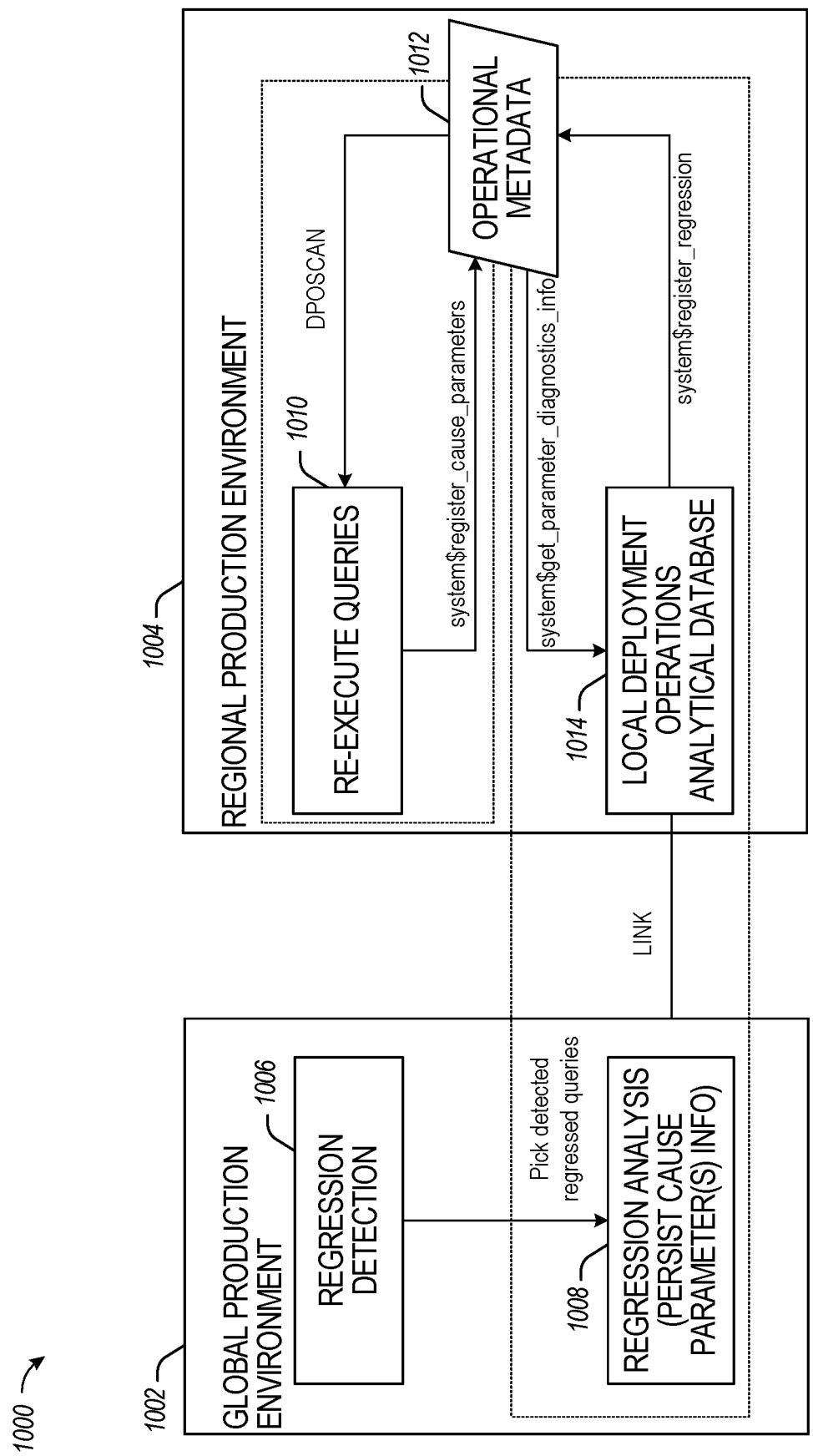
FIG. 10 illustrates remote query re-execution in connection with the rollout of database changes, in accordance with some embodiments of the present disclosure.

In some embodiments, the recurrent query infrastructure 622 is used during regression detection 610. The recurrent query infrastructure 622 can be configured with configuration-based identification methods and a recurrent query information processing pipeline (e.g., individual job data and aggregated statistics supporting various applications built on top; as well as regression detection, feature rollout analysis, plan analysis, workload analysis, etc.). An example recurrent query information processing pipeline is illustrated in FIG. 7. Remote query re-execution is illustrated in FIG. 10.

In some embodiments, regression detection 610 is in communication with the recurrent query infrastructure 622 and the plan hashing 626.

In some embodiments, regression based on new incidents and user errors can be configured based on the following considerations: detect regressions for rollouts that happen outside the release cycle (e.g., better coverage than retry-based detection, which only applies to new releases); heuristic alerting pipeline balances among accuracy, speed, and noise; and first-hand investigable query data for SQL on-calls and regular system health check.

In some embodiments, regression based on plan change tracking can be configured based on the following considerations: leverages SQL plan hashing infrastructure; built on top of the recurrent query infrastructure; maintains expected plan hashes of the recurrent queries; dumps when a plan hash is changed; and expected future usages (e.g., customer regression analysis, rolling out a SQL plan change, etc.).

In some embodiments, the plan hashing 626 can include the following configurations: PlanHashBuilder (computes plan hash using either cryptographic or non-cryptographic hashing functions); PlanHashField (enumerates currently computable plan properties, e.g., Plan Node Name, Execution Scheduling Information, Logical and Physical Data Types, Expression Representations, etc.); PlanHashConfiguration (controls the inclusion/exclusion of the fields; for fine-tuning, the computation can depend on the purpose; and more fields included means less chance that two plans are regarded as matching); computed at the end of compilation (could change to be computed at each compilation stages); Query Information; computation process can be visualized; used by a plan change detection mode during testing; and no performance overhead as validated through atomics testing.

In some embodiments, the re-execution infrastructure 624 can be configured as an online infrastructure with the following configurations: remote execution framework improvements in global query testing environment; auto-trigger query re-execution for parameter diagnosability (efficiently binary search culprit(s) with non-statement parameter value overriding mechanism, and task-based automatically DPO scan for new regression analytic requests); and access control and auditability (protect from compliance concern and arbitrary usage with low-security risk and solid boundary).

In some embodiments, the re-execution infrastructure 624 can be configured as an offline parameter comparison tooling for finding out differences in parameter settings between production queries (e.g., support comparison for default and non-default parameter usage at all levels; and essential prerequisite to serve query re-execution for pinpointing root cause parameter(s)).

In some embodiments, the re-execution infrastructure 624 can be configured as an offline re-execution infrastructure with the following configurations: integration of regression detection and analysis, cause parameter analysis requester (e.g., call parameter comparison tool to generate parameters differences and remote call system functions to add metadata entries for each regression), and cause parameter analysis fetcher (asynchronously fetch caught root cause parameter and backfill table detected regression).

The following configurations can be used for the recurrent query infrastructure 622.

Overview. Recurrent queries constitute a large percentage of production workloads, and they are greatly invaluable when it comes to detecting regressions since the expectation is usually that a query that was successful before should not fail in the new setting. Building an underlying infrastructure for such production queries could help us efficiently detect the "good" and "bad" query IDs, which can be used as an essential input to the automated regression analysis pipeline, for pinpointing the root cause parameter(s) after iterative query re-execution with different parameter settings, as well as mitigating the issue promptly for subsequent query recurrence.

Infrastructure (e.g., offline infrastructure). The abundant production query data collected in a production environment of a database system supports offline analysis of recurrent queries in many aspects. Originating from information about individual queries on the database, tables, and views were created as the main resource to further RCA recurrent query regression with first-hand investigable info. New data generated from identified recurrent queries are regularly aggregated into this infrastructure, by using periodic Tasks as the automated mechanism to make sure any emergence of new regression can be detected and analyzed timely. When more identification methods are introduced, more recurrent queries are recognized from various perspectives with improved observability data, which allows for better understanding and serving customer queries in the long term.

Additional configurations (e.g., online infrastructure). Unlike offline infrastructure which highly relies on historical query data exported to a testing infrastructure after query execution, online infrastructure focuses on the status of "live" production queries.

Offline Recurrent Query Infrastructure

Overview. A large percentage of production workloads and queries are recurrent, especially important queries that are mission-critical. Monitoring and analyzing these queries automatically help in understanding the customer workloads better and detect regressions proactively. The following description aims to provide a detailed explanation of the leveraged recurrent query infrastructure for offline analysis, in terms of the building process, regular info processing for fresh data insertion, current focuses, and future opportunities for more applications built on top.

Infrastructure Components. The Offline Recurrent Query Infrastructure is similar to a Native Application that is built on top of global query-level information views. To better understand when a query is considered as RECURRENT or AD-HOC, the next section aims to set some context. However, to find out what data can be used in this infrastructure, the section Objects includes detailed descriptions for quick reference.

Configuration-based Identification Methods. To determine if a production query is a valid recurrent query, two questions need to be clarified first: (a) When a query occurs again, which method can be used for identifying it as the same query; and (b) Ways to evaluate query pattern, so that we will not mistakenly take a temporary query as recurrent.

Identification Methods. query text hash can be used to uniquely distinguish two queries from their texts. However, more criteria can be applied to observe queries in various dimensions. For example, binds could be ignored by replacing them with identifiers while object references could use the qualified name as a substitute. This helps with the introduction of more sanitization and less strictness in query texts. Even if the query texts are different, two queries can share the same feature vector, making them also "identical" to some extent. With more observability data being captured from online infrastructure, processing efficiency can increase. The offline infrastructure is supporting recurrent queries identified by query text hash. In some aspects, parameterized query text hash can be incorporated with its availability in production, and more recurrent queries can be discerned.

Time. The stability in query pattern guarantees the developer is not randomly selecting ad-hoc queries for analysis, which are less valuable in terms of analytics cost. To measure this quantitatively for more flexibility in further investigation, the following Recurrent Query Configuration with properties as listed in Table 1 below can be used:

TABLE 1

| Configuration Property | Description |
| --- | --- |
| Deployment | The deployment where the recurrent query executed |
| Identification Mode | The identification method applied for detecting unique queries |
| Interval Size in Hour | Interval length in Hour units |
| Number of Intervals | How many intervals in one row are evaluated for the recurrent query status |
| Min Occurrence per Interval | For each interval, the query has to run for at least some time for being considered ACTIVE; whenever it fails to reach the limit, it can be marked as MISSED |
| Allowed Max Missed Intervals | The upper bound of a recurrent query can be in MISSED status for continuous intervals; after that, it can no longer be considered as ACTIVE but ENDED, until its query pattern meets the applied config again. Recurrent queries that emerged recently, which are ACTIVE for M (<number_of_intervals) continuous intervals, can be considered as recurrent query candidates that are in TOO_NEW status. Once M = number_of_intervals, they can be migrated into offline infrastructure as new recurrent query input. |

TABLE 2

| Type | Name | Description |
| --- | --- | --- |
| Table | RECURRENT_QUERY_JOBS | Job data for all identified recurrent queries |
| Access Controlled | RECURRENT_QUERY_HISTORY | Aggregated stats for all identified recurrent queries |
| | RECURRENT_QUERIES | All identified recurrent queries, status records, and applied configurations |
| View | RECURRENT_QUERY_JOBS_V | Job data only for ACTIVE recurrent queries |
| | RECURRENT_QUERY_JOBS_RAW_V | Same data as recurrent_query_jobs for public use |
| | RECURRENT_QUERY_HISTORY_V | Aggregated stats only for ACTIVE recurrent queries |
| | RECURRENT_QUERY_HISTORY_RAW_V | Same data as recurrent_query_history for public use |
| | RECURRENT_QUERIES_V | Only ACTIVE recurrent queries, status records, and applied configurations |
| | RECURRENT_QUERIES_RAW_V | Same data as recurrent_queries for public use |

Column Descriptions:

(a) RECURRENT_QUERY_JOBS—this table holds the identical data in a regular historical view of individual queries, with one additional column recurrent_query_id, which is the unique identifier per recurrent query.

(b) RECURRENT_QUERY_HISTORY—this table holds aggregated stats from all unique queries that ended in the same hour, per recurrent query.

Objects. Three types of underlying tables and corresponding public views can be actively updated and maintained in a schema, for example, one such schema could be named sql_rollout_automation_db.recurrent_query_infra, as listed in Table 2 below:

(c) RECURRENT_QUERIES—this table holds data about identified recurrent queries, like their status per interval and configuration property values.

(d) Recurrent Query Identifier—the recurrent_query_id value is computed from a combination of applied configuration and the first occurrence info per recurrent query.

Automated Info Processing Pipeline. In some aspects, the offline infrastructure uses the configuration that "a query which runs at least 5 times per day, for 7 days in a row, with the same query text hash, while it is allowed to fail to run for 5 times in only 2 continuous days" will be considered as ACTIVE recurrent queries. The specific number of times per day, how many days in a row, and how many times can run in several continuous days are all configurable parameters. In some aspects, after the initial data dump, a developer can find out all ACTIVE recurrent queries. For every new data exported to the regular historical query information view, which is relevant to these identified recurrent queries under the configuration, an automated pipeline is running behind for regular info processing. Specifically, 3 types of independent tasks were created for known recurrent queries data processing, as illustrated in FIG. 7.

FIG. 7 is a block diagram illustrating known recurrent queries data processing 700 in connection with the rollout of database changes, in accordance with some embodiments of the present disclosure. The known recurrent data processing can include processing operations 702, 704, 706, 708, 710, and 712, as illustrated in FIG. 7.

This task refers to the identified recurrent queries by some configuration, for filtering out their related query information and then inserting them in recurrent query history tables with higher frequency (every 12 hours), along with corresponding recurrent_query_id attached to each query entry, for populating purposes.

Figure 8:
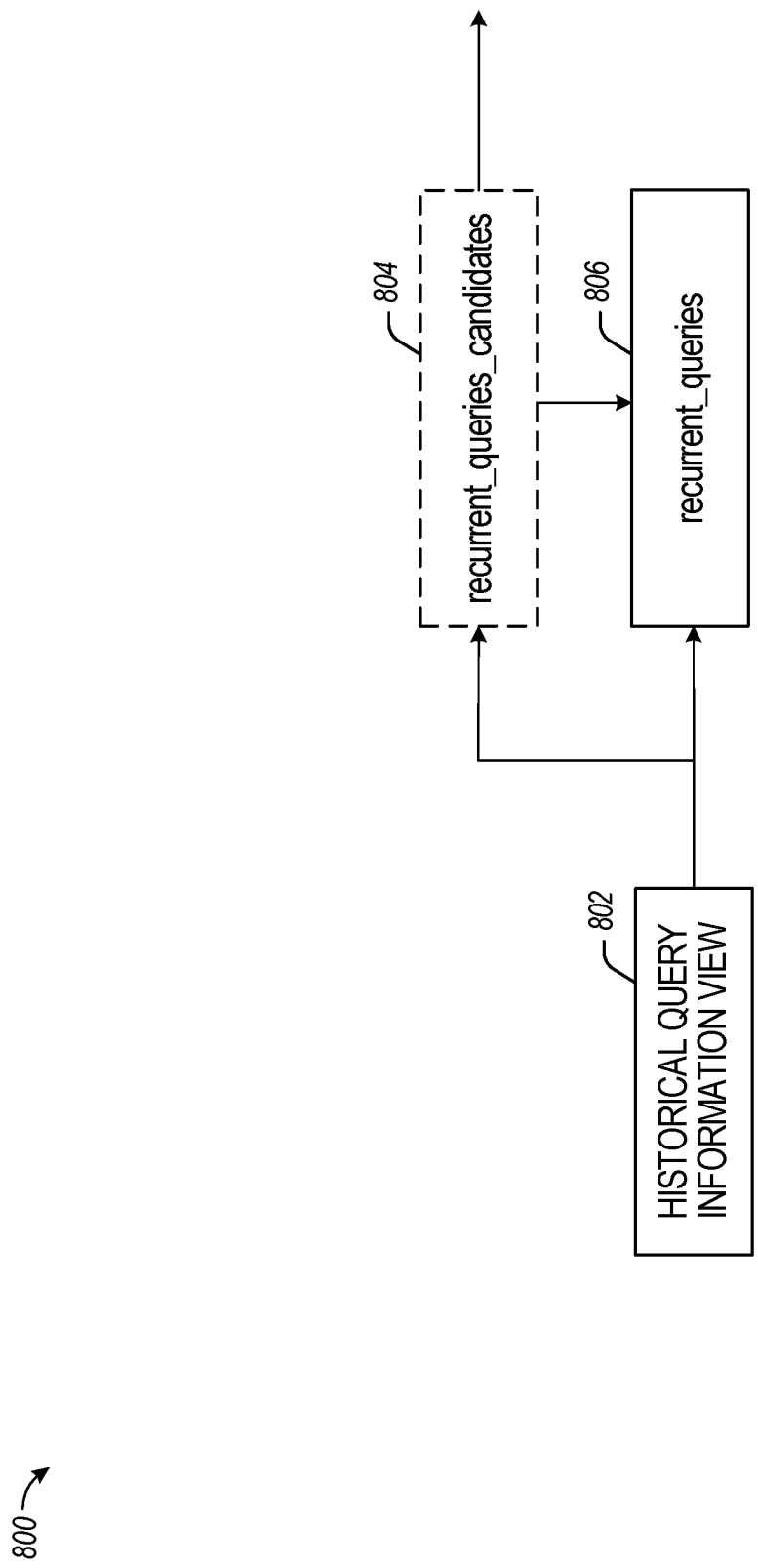
FIG. 8 is a block diagram illustrating new recurrent queries data migration in connection with the rollout of database changes, in accordance with some embodiments of the present disclosure.

New recurrent queries data migration, as illustrated in FIG. 8.

FIG. 8 is a block diagram illustrating new recurrent queries data migration 800 in connection with the rollout of database changes, in accordance with some embodiments of the present disclosure. The new recurrent queries data migration 800 includes processing operations 802, 804, and 806, as illustrated in FIG. 8.

The second task monitors the current status of each recurrent query as valid candidates. Taking the applied config as an example, it runs every day to update the query pattern of each entry using previous daily data. If a candidate appears to be ENDED after the update, it will be cleaned up from the candidate table. However, this rule is not effective for known recurrent queries. If a candidate becomes ACTIVE, it will be promptly migrated to a known recurrent query group for further usage.

New recurrent queries data backfilling. This task focuses on history data for newly identified recurrent queries to be backfilled for public use.

Recurrent Query Infrastructure Design

Raw Data. This infrastructure supplies raw data updates at a frequency of every hour and every day (e.g., recurrent_query_jobs_etl_<1H|1D> and recurrent_queries_<1H|1D>).

Views. Since the data size of raw data will get larger gradually, more granular views from a time perspective can be generated on top for better query performance.

Dimension. Recurrent Configuration: Recurrent_Interval: Day, Week, Hour; Recurrent_Internal_Length:; Recurrent_Internal_Count:; and Status: Active/Missed/Ended.

Stored Procedure. Example configuration update_recurrent_config (unit, length, count, gap).

Description. For example, update_recurrent_config ('hour', 24, 24, 0) means a query that has run 24 times in the last 24 continuous hours (on average, once per hour) can be counted as a valid and active recurrent query. If it misses a run in an hour interval, it will be considered as "Missed".

For example, update_recurrent_config('day', 3, 1, 1) means a query that has run once in the last three continuous days can be counted as a valid and active recurrent query. If it runs on Day 1, misses on Day 2, but continues on Day 3, we still consider it active. If it misses two days, it will be considered as "Missed". After more than two days, it becomes "Ended".

Implementation Details

Depending on the configuration, a call to this SP will generate the new base set of recurrent queries, and modify the task used for updating the status of existing recurrent queries and detecting new queries.

In some embodiments, the following configurations are provided for the recurrent query infrastructure:

(a) Tables—T1: recurrent_query_jobs; T2: recurrent_query_history; T3: recurrent_queries.

(b) Views—data same as table; V1: recurrent_query_jobs_v; V2: recurrent_query_history_v; V3: recurrent_queries_v.

(c) Identification methods—query text hash; parameterized query text hash; feature vector.

(d) Issues—populate recurrent_query_id; group by intervals; put data from recurrent queries; identified using different methods in one place; performance.

(e) StoredProc: infrastructure maintenance.

(e.1) insert_recurrent_query_jobs(time_unit, num_units, time_stamp)—dumps new Job data and assign recurrent query ids for each identification method; supports hourly update: insert_recurrent_query_jobs('hour', 1, current_timestamp( )).

(e.2) insert_recurrent_query_history(time_unit, num_units, time_stamp)—dumps new history data for queries per identification method; supports hourly update ~1 min.

(e.3) insert_recurrent_queries_by_config(identification_mode, interval_unit, interval_size, num_intervals, min_occurrence_per_interval, time_stamp)—accepts variable configs, generates base data for new config, supports interval sized update schedule.

(f) StoredProc: infrastructure usage.

(f.1) get_recurrent_query_job_data_by_config(identification_mode, interval_unit, interval_size, num_intervals, min_occurrence_per_interval, time_stamp, total_intervals, max_missed_intervals).

Figure 9:
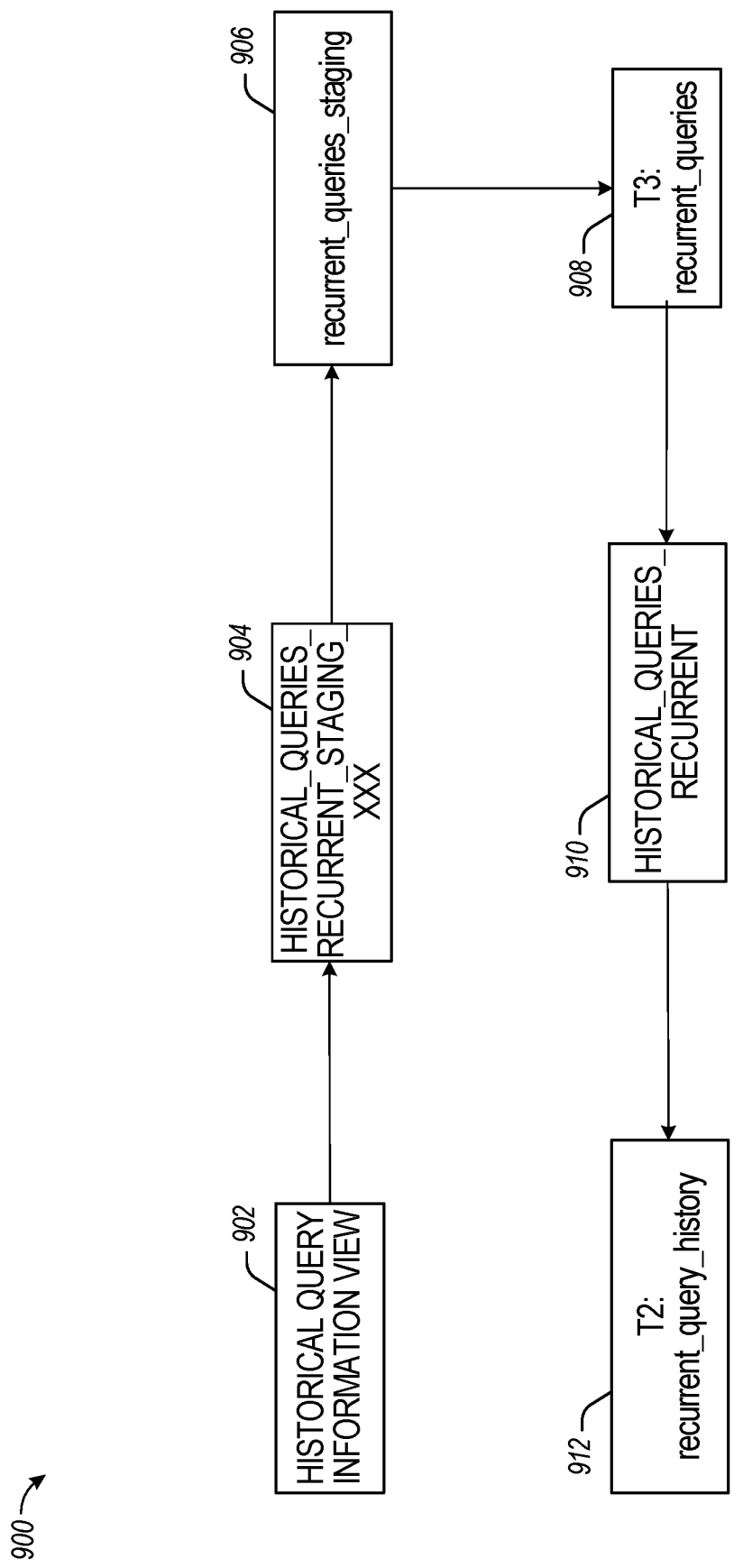
FIG. 9 is a block diagram illustrating a processing flow for recurrent query staging, in accordance with some embodiments of the present disclosure.

FIG. 9 is a block diagram illustrating a processing flow 900 for recurrent query staging, in accordance with some embodiments of the present disclosure. Referring to FIG. 9, processing flow 900 includes operations 902, 904, 906, 908, 910, and 912 described below. Initially, base data is generated. For example, the configuration is a query that runs at least once every three hours, with 10 three-hour intervals in a row that can be identified as recurrent, using SQL text hash (0) as the identification method.

Operations 902-912 can include the following functionalities:

(a) Collect a period of historical query information.

(b) Starting from the earliest interval, an aggregate number of unique queries per query text hash for figuring out query occurrences in that interval.

(c) At the very beginning, since recurrent_queries_staging has no entry for this config, dump the earliest interval data to it with missed_intervals=1−10=−9. For subsequent intervals, dump them into the staging table, with missed_intervals updated based on the preceding interval's missed_intervals, occurrence_in_current_interval compared to min_occurrence_per_interval, i.e. 1, in this example. From the last interval, all query status is known by applying that configuration.

(d) For any entry of the last interval, if it has missed_interval<=missed_interval_allowed_max_times, copy that row into T3.

(e) Joining T3 with the temporary historical recurrent query table using query text hash as the join key, the corresponding Job data can be filtered for all recurrent_queries in T3. The historical query information can be updated with recurrent_query_id in T3, then can be dumped into T1.

(f) Aggregate T1 grouping by end_time_to_hour and recurrent_query_id to insert history data.

In the above processing, the following tables can be configured for staging:

(a) recurrent_query_staging.

(a.1) Description: created with a suffix; <interval_size_in_hour>_<num_intervals>_<min_occurrence_per_interval>_<identification_method>; temporarily holds historical query information for queries that occur in an interval/intervals in a row; created only when we need to generate base data for a new configuration, or update recurrent query data from new interval for existing configuration.

(a.2) Columns: similar to historical query information view with an additional column feature_vector.

(b) recurrent_queries_staging.

(b.1) Description: has the configuration and status information of all identified queries in past intervals; each row is generated from a group by the end time of an interval in hour format and the actual value of the identification method applied for the configuration so that the occurrence of each query which ended in some interval can be easily computed.

In the above processing, the following tables can be configured for infrastructure interfaces:

(a) recurrent_queries.

(a.1) Description: the same data as the recurrent_queries_staging table, except only recurrent queries that are active/too new/missed for acceptable times, will be added. Besides, a recurrent query id would be generated whenever a new recurrent query was identified.

(b) historical_queries_recurrent.

(b.1) Description: historical query information of all recurrent queries in recurrent_queries table; uses data temporarily held in historical_queries_recurrent staging table as the source, plus the corresponding recurrent query id will be added for each row.

(b.2) Columns: similar to historical query information view with an additional column feature_vector.

(c) recurrent_query_history.

(c.1) Description: hourly aggregated stats for each identified recurrent query, updated after each time new historical query information has been added to the historical_queries_recurrent table.

The following configurations can be provided for the integrated usage tracking infra 618.

Usage tracking improvements can include the following. Usage tracking has grown into an important piece of infrastructure that developers can rely on for tracking the rollout of features as well as performance improvements.

The following improvements to database system service implementation can be considered:

(a) Categorization and proposed API. For example, further sub-categorize current "features" in usage tracking so that each category can be better standardized.

(b) Property of the query. This category refers to features that are descriptive of the properties of a specified query. Examples of this like whether the query contains a specific construct, e.g., recursive CTE, views, built-in functions of subqueries, etc. The main use case for this tracking is to help us get a better understanding of the customer workload, e.g. to provide comprehensive testing coverage. For this class of features, a single counter can be added that denotes the number of times the feature occurs in the query.

(c) Internal optimization tracking. Another type of feature is intended for tracking the state of optimization. Examples of this include aggregation placement, materialized rewrite, search optimizations, etc. The main use case is both to track the rollout process, as well as to get an understanding of feature adoption, and to check the health of the feature once it is rolled out.

In some embodiments, the following configurations can be provided for automated rollout testing (e.g., production testing 606).

Integrated Usage Tracking. The following configurations can be used to provide a way of tracking the usages of parameters so that the process of pre-release feature testing can be automated and the same dashboards can be shared for monitoring the rollouts of parameters. To achieve this purpose, a class called AutomatedRolloutParameter can be used, which is a derived class of the Parameter class.

A suggested workflow for using AutomatedRolloutParameter includes:

(a) Make a code change and guard the change with an AutomatedRolloutParameter.

(a.1) Available parameter values. AutomatedRolloutParameter accepts 4 predefined values: Disable, Track, Prerelease, and Enable. These values can be selected to distinguish AutomatedRolloutParameters from other types of Parameters in a testing environment.

(b) Merge the code change. Once the change is merged and reached production, the corresponding usage tracking records can be located in the testing environment (e.g., when the parameter value is Track, Prerelease, or Enable).

(c) Activate automated testing. When the parameter value is set to Prerelease, the prerelease feature testing will become available. Background tasks running in the test environment are collecting query samples ahead for those parameters so that the turn-around time can be shorter and the samples are chosen efficiently.

In some embodiments, the following configurations can be provided for the re-execution infrastructure 624.

In some embodiments, the re-execution infrastructure 624 can be configured to automatically invoke query re-execution for detected regressions in a database architecture for diagnosing root cause parameter(s). This processing can be beneficial to not only accelerate the process for root cause analysis on customer issues but mitigating query regression for online analysis.

In some aspects, the following use cases can be configured:

(a) Automated process. An end-to-end automation pipeline can be used for reducing engineer pain points in the existing slow rollout process for analyzing regression.

(b) Manual process. For regressed ad-hoc queries uncaught in offline Recurrent Query Analysis Infrastructure, this mechanism can also be manually run for detecting the culprit.

FIG. 10 illustrates remote query re-execution 1000 in connection with the rollout of database changes, in accordance with some embodiments of the present disclosure.

In some embodiments, the re-execution infrastructure 624 can be configured to provide an end-to-end pipeline design for automatically re-executing queries in a database system account, via remote system function call from a global production environment account 1002 to a regional production environment 1004. FIG. 10 further illustrates an end-to-end pipeline to remotely re-execute queries for parameter diagnostics (e.g., including regression detection 1006 and regression analysis 1008 at the global production environment account 1002, and regional production environment query processing 1014 and query re-execution 1010 using an operational metadata 1012), integrate regression detection with regression analysis in automated and manual ways, and protect the pipeline with access control model and auditability mechanism.

The built-in remote query re-execution mechanism (e.g., as illustrated in FIG. 10) supports an automated end-to-end pipeline that runs in a global production environment and makes remote calls to each regional production environment, for parameter diagnosability in user accounts over production deployments.

The following provides an additional description of the essential underlying components of this pipeline, which suffices for detecting cause parameter(s) iteratively by re-executing queries with different parameter settings that are generated from a parameter comparison tooling, to reduce large pain points for the entire Engineering Team in regression analysis on query execution issues.

In some aspects, the remote query re-execution mechanism includes the following configurations:

(a) Offline components. Due to compliance concerns, customer data may not be freely taken out or gone outside of the existing production deployment. To support query re-execution in target accounts, while the processing pipeline is located in a global production environment, org users that exist in both global and regional production environments can be provisioned and imported, to remotely call system functions that are limitedly available in the regional production environment accounts with specific privilege check.

From the diagram above, the internal function—system$register_regression—becomes remotely callable in the global production environment, and desired parameter setting info is registered (e.g., query IDs for re-execution, etc.) into dedicated operational metadata. After parameter diagnosis, the result is retrieved by remotely calling another system function—system$get_paramete_diagnostic_info, for data backfilling. An exporter tool can also be leveraged for backfilling cause parameter(s) info, however, the second internal function brings more flexibility to this pipeline.

(b) Online components. As the most crucial part for pinpointing the culprit, a stored procedure that uses Binary Search can efficiently find out the root cause parameter by re-executing a good query ID, against different parameter settings for several iterations. These settings are generated by a parameter comparison tooling, which takes in good and bad queries ids, as well as their deployment names, for comparing the good query that usually ran successfully in the previous release, with its counterpart—the bad query that regressed in the current release, to figure out their differences in parameter settings at all levels.

(c) Automated process.

(c.1) detected_regression Table. The above sections focus primarily on the Regression Analysis module. To integrate it with the existing Regression Detection module, a dedicated table—detected_regression—can be maintained. Such a table captures every single new regression that emerged during a release, by looking into data persisted in Offline Recurrent Query Infrastructure, along with important info like hitCount that indicates how many queries regressed on a particular issue. It also provides the source data—good and bad queries as well as their deployments and so on, for being delivered to the offline components for regression registration.

In some embodiments, the monitoring and alerting 608 can be configured with the following functionalities:

(a) Partial rollout progress dashboard providing visibility in the parameter slow rollout process. The dashboard can include sections, which help answer commonly asked questions (e.g., what are all the parameters that are currently undergoing the partial rollout process; given a partial rollout parameter, what is its partial rollout configuration in a deployment; given a partial rollout parameter, find a list of accounts and deployments it has been enabled for; given an account, find a list of partial rollout parameters that's enabled for that account).

(b) The following views can be configured:

(b.1) Number of parameters being partially rolled out on each deployment. This view describes the number of parameters that are partially rolled-out in each prod deployment weekly. It supports evaluating the workload and progress of the historical partial rollout process. Hanging over these bars, a pop-up window displays details of parameter aggregates for each deployment in descending order.

(b.2) Top area with most partial rollout parameters. This bar chart describes the number of partial rollout parameters for each area in descending order. With this chart, team activity is analyzed in a partial rollout process.

(b.3) Top account with most partial rollout parameters. This chart describes the number of partial rollout parameters enabled for each account in descending order. Due to the large size of the query result, only a pre-configured number of accounts can be used. To quickly figure out the deployment from which an account comes, the y-axis displays both the account name and deployment name.

(b.4) Number of deployments and accounts enabled per partial rollout parameter. This table describes the number of deployments and accounts that have been enabled for each ongoing partial rollout parameter, with parameter names sorted in alphabetical order. From this table, the partial rollout progress of a parameter can be tracked at all deployments and accounts.

(b.5) Number of deployments enabled per partial rollout parameter and number of accounts enabled per partial rollout parameter.

(b.6) Partial rollout configuration (by parameter). This chart visualizes partial rollout configuration for an individual parameter in deployments that have been enabled for it. Along with other views, the percentile an account is in during the partial rollout process can be observed.

(b.7) Accounts enabled per deployment in percentage (by parameter). This chart describes the percentage of accounts that have been enabled for an individual parameter in each deployment by sorting the percentage in descending order. This chart can be used for tracking the partial rollout progress at the account level.

(b.8) Accounts enabled for a parameter (by parameter). This table describes all accounts that have been enabled for an individual parameter.

(b.9) Parameters enabled for an account (by account name). This table provides an account-centric view for finding out all partial rollout parameters that have been enabled for an individual account. For On-call Engineers, this table is useful for pinpointing culprit parameters for susceptible accounts.

In some embodiments, the following configurations can be provided for the regression detection 610 functionality.

Types of Regressions. This section briefly describes the different types of regressions that can be expected from database changes and their potential detection mechanisms. A detailed description of each detection mechanism will be provided herein.

Data and Metadata Corruption. Data corruption is the most serious type of regression a SQL change could cause. This happens from wrong results during DML statements, bugs with the insert code path, or bugs with metadata generation.

Several mechanisms can be used for detecting metadata and data corruption, including the Metadata Checker and the Data Consistency Service. The Metadata Checker checks for invariants at the metadata level to look for inconsistencies before and after DML operations. These include aspects such as row count, min/max metadata, physical types, etc. The checks the metadata against various Data Consistency Service levels of data for inconsistencies. In some aspects, this functionality also applies to other table types such as external tables.

Wrong Results. Wrong results issues come from either bugs during plan generation or unexpected behavior during query execution. Wrong result issues can be difficult to detect in production. One option is to perform testing before rolling out the change to production, including leveraging targeted testing that covers the target queries of the change.

Internal Incidents and Query Failures. Internal incidents can be raised when unexpected behaviors are encountered during query compilation or query execution. In some cases, the unexpected behavior does not have an impact on the overall correctness of the query execution, and in such cases, the exception can be detected and the query execution is allowed to proceed (usually after logging the unexpected behavior or raising non-fatal incidents). However, in most cases, there are no known mitigations for these unexpected behaviors and the best course of action would be to fail the query execution.

In some aspects, fatal incidents can be created for such cases and additional information is recorded such as the stack trace. The query retry mechanism can be used to detect internal query failures automatically. Besides a query retry, such regressions can be detected by identifying recurrent queries that have been executed successfully previously and are failing under new configurations. Another case with internal failures involves non-deterministic failures such as out-of-memory errors. In such cases, a developer cannot look at individual queries, and a more sophisticated correlation analysis would be needed to detect regressions.

New User Errors. Regressions that produce new user errors can be difficult to detect since in most cases user errors could be expected from customers. These can be raised when customers write invalid queries or use unsupported features in their queries. However, database changes could cause regressions, where a previously successful query would fail with a user error when the change is enabled. In some aspects, query retry can be used to detect a subset of such regressions, through retrying common types of user errors. Similarly, correlation analysis can be done to infer whether the volume of user errors might be related to the rollout of a database change.

Performance Regressions. Performance regressions are more diverse and harder to detect properly compared to the types of regressions listed above. Query execution performance varies by nature, and it is important to distinguish between performance regressions caused by a particular database change with degradations caused by system resources, variations in cloud environments as well as variations in the customer workload.

There is a large variety of metrics to consider in relation to performance regression detection. These include general timing metrics such as latency, total elapsed time, breakdown of each phase of the execution; general performance metrics; and feature-specific performance.

Workload-Level Regressions. Workload-level regressions can be difficult to detect and diverse. For example, regressions at this level could be due to serverless background services that experience a degradation, e.g., gradually worse clustering quality. It could also be cost spikes that cause the service to be stopped or an overall slowdown with an aggregated performance at the workload level.

Infrastructure. This section describes some short-term infrastructure improvements for regression detection, including both online mechanisms such as query retry, as well as offline mechanisms that involve more sophisticated aggregated analysis. Note that this section currently focuses on several metrics. For example, for compilation performance regression detection, we could look at metrics specific to Optimizer rewrite rules or several calls to deep clones.

Performance regression detection is a complex problem, and there are a large number of mechanisms that we need to employ to detect performance issues. These include aggregated analysis of the performance-related metrics, monitoring for feature-specific performance metrics, performance *canaries*, recurrent-query-based analysis as well as workload-based monitoring.

It is important to note that performance issue detection is not equivalent to performance regression detection. Performance issues constitute a much larger superset of performance regressions since there are a large number of other scenarios that could result in performance issues, even without any database changes to the system. Therefore, a root cause analysis component that considers more factors compared to the pipeline that detects the performance issues is an absolute requirement for successful performance regression detection. Without this, general detection mechanisms can be implemented in the short term and skip many advanced mechanisms required for performance regression detection and workload regression detection.

Query Retry. Query retry is an important mechanism deployed in production to ensure the success of customer query executions in case of initial failures, and it has also been used to surface database change regressions during releases.

The query retry mechanism can be improved to work better with the database change rollout automation process since the rollout process mostly happens gradually and outside of the regular release cycle. To enable query retry to help identify the parameter that is causing the issue, query retry can be enhanced to be aware of the parameter that is currently under rollout for the failed query.

More concretely, the query retry mechanism can be configured to fetch the parameter(s) currently under rollout for the query that it needs to retry, and ideally, retry with only these parameters disabled. This will make it much easier to pinpoint the cause of the regression, and would also avoid disabling a large number of parameters for the retry query. Further integration can be used with the parameter rollout automation infrastructure for this to work. The parameter setting infrastructure has knowledge/visibility of all parameters under rollout, and ideally, it should avoid rolling out multiple parameters on the same customer at the same time as much as possible. The query retry infrastructure would need to be able to fetch this information from the parameter rollout automation infrastructure when deciding on the retry configuration.

Integrated Usage Tracking. The existing usage tracking infrastructure enables developers to instrument the code to emit dedicated tracking as part of query compilation and execution. Currently, this infrastructure is being leveraged for several purposes:
  (a) Tracking query features. These can be viewed as properties of the queries themselves. Examples of this category include tracking table access information, and query constructs that appear in the query (e.g. recursive with, pivot, etc.).
  (b) Tracking the application of internal optimizations. Additional context often provides useful insights for tracking and improving the implementation of existing features. For example, tracking the reasons for unsupported subqueries can help us decide on the priority of dealing with subquery-related issues.
  (c) Tracking the rollout of a change. For this use case, the developer usually adds the usage tracking to mark queries where the optimization would have applied, and then proceed to do testing before starting the rollout. During the rollout, the developer would build dedicated dashboards based on the usage tracking to monitor for potential regressions.

The third use case is the most relevant for rolling out database changes, and additional usage tracking is a critical step for the safe feature rollout process. However, each step is separate from the other and has to be performed manually. The improvements proposed here aim to deliver a more standard process for adding usage tracking to roll out database changes. This not only enables more automation for existing steps but also boosts our ability to detect regressions.

With integrated usage tracking, a separate interface can be used for specifying tracking information for a change that is under rollout. The new API would be separate from the default usage tracking APIs and takes in the controlling parameter as an argument. This API has two flavors and allows specification in the code of whether the new change is applicable and whether the new change has been applied.

In some aspects, this tracking can be done separately from the parameter infrastructure, since the parameter check-in itself does not provide enough information regarding whether the change is applicable or applied—the implementer has the best knowledge of this and should explicitly invoke the APIs.

An action that can be considered from the developer's perspective is to add the rollout-specific tracking in the code, as well as mark whether the change is applicable or has been applied for a given query. Along with this, the developer needs to adopt a tri-value (disable/track/enable) controlling parameter for the integration to work.

In some aspects, the integrated usage tracking framework enables the automation of the following steps:
  (a) Pre-production testing of the change. Once the code change is in production, a developer can automatically pick up parameters whose value has been flipped to "TRACK" mode in the new release, and automatically trigger testing using queries that are applicable for that parameter (where the rollout tracking shows up as Applicable).
  (b) Monitoring the rollout. Once the slow rollout begins, the system can automatically monitor queries that are leveraging that parameter (where the rollout tracking shows the query as Applied for that parameter), and a shared dashboard can be built for tracking the rollout of changes.
  (c) Regression detection and analysis. With standardized information on which parameter was applied for any given query, we can build further automation to detect regressions that are caused by that parameter.

Recurrent-Query Based Analysis. Recurrent queries constitute a large percentage of production workloads, and they are invaluable when it comes to detecting regressions since the expectation is usually that a query that was successful before should not fail in the new setting. In some aspects, query text hash-based regression detection can be used, but it can be strict and can result in missed opportunities to detect other recurrent queries that are slightly different.

For plan stability, more lenient query hashing can be used which allows comparing similar queries, which can be leveraged to identify regressed queries. With this information, the DCRM 128 would be able to detect new query failures as well as performance regressions. The recurrent query analysis infrastructure could surface the "good" and "bad" query IDs, which can be used as input for subsequent automated analysis.

Usage Correlation Analysis. A volume-based regression detection mechanism that covers several most commonly seen SQL incidents can be used. However, similar to query retry, this does not work very well with the rollout automation process, which rolls out parameters gradually that is decoupled from the release. By design, this will reduce the spikes in incident volumes at the global level and make it harder to detect any regressions this way.

On the other hand, with the integrated usage tracking mechanism described above, more granular analysis can be performed to determine whether a change in an incident pattern could be related to a specific rollout.

Cause Parameter Detection. For some mechanisms above (e.g., recurrent queries), detecting that there is a regression is only part of the processing. A subsequent step to automate would be to confirm the root cause parameter—in the future this information could be fed back into the release automation infrastructure to automatically pause/roll back the offending change in production. Given the parameter difference that we have captured between the two queries, this tool would automatically execute the queries to determine the root cause parameter.

Performance Regression

The following configurations can be considered for performance regression (which is one type of regression that can be detected by the DCRM 128).

Motivation. The compilation is an essential component of query processing, and as database systems handle rapidly increasing volumes of customer queries with greater complexity, good compilation performance can be maintained while we scale with our growth and keep on delivering new functionality and features. Stable, reliable, and efficient compilation performance is an integral part of overall query performance as more customers set up mission-critical workloads to run on a database system.

Several factors make compilation performance observability a complex problem to tackle:

(a) The nature of cloud environments and the fact that cloud services are a multi-tenant system means that query compilation shares resources with a lot of other operations, including topology management, multi-layer communications, and disk accesses, to name just a few. Performance variance could be very high, and the noise-to-signal ratio is very poor for naïve observability and alerting approaches.

(b) Variations in customer workloads themselves could impact compilation performance. Compilation performance could be expected to change due to changes in workload patterns, query patterns, data volumes, etc. and it is often hard to distinguish between whether changes could be expected with respect to changes in underlying workloads.

(c) Compilation performance issues come from a huge variety of different sources. There can be slow compilations that are caused by almost every conceivable reason, ranging from bugs, implementation inefficiencies, query complexities, and interactions between different layers to resource contention and variations. Due to the complexity of the factors involved, it is sometimes difficult to reach definitive conclusions for investigations.

(d) Since a multitude of factors is involved, compilation performance issues often need input from multiple teams, and knowledge silos within each team often prevent efficient communication and collaboration. Oftentimes the responsibility and process of investigation are not clear, resulting in processing inefficiency.

(e) Maintaining good compilation performance is a constant uphill battle against new features and functionality. The query compiler is the central component of our query engine, and more features are constantly added which increases the complexity of the compiler. Therefore, it can be useful to know of potential regressions caused by new features and balance the new functionality required against the inevitable downsides to compilation time overhead.

Here are the main issues and pain points with compilation performance observability in a database system:

(a) Lack of alerting. This deprives the database system of the opportunity to detect compilation time issues and mitigate them early. A variety of monitoring mechanisms for compilation performance can be used, but these have not been fully integrated with the on-call workflow.

(b) No automation for diagnostics. As mentioned above, commonly most of the diagnostics for compilation performance is done manually through a collection of ad hoc investigation methods. There may be limited options to automatically inspect relevant information and triage the problem before sending issues to developers, and this is not a scalable solution in the long term.

(c) Missing information. During the manual investigation of compilation time issues, we often find ourselves wishing we could have captured more information to help with diagnosing the problem. As a result, sometimes we cannot make much progress without making code changes to deploy additional metrics or logging, and that is not always possible retroactively.

(d) No dedicated focus and ownership. Observability practice includes dedicated ownership for metrics as well as monitoring and alerting pipelines. As query volume is growing exponentially, the lack of dedicated owners for the compilation performance area means other developers get randomized to help, and no one is actively maintaining existing observability mechanisms to make sure they are still reliable. Over time, metrics could change, more metrics need to be added and monitoring dashboards need to be updated to reflect up-to-date information and best practices.

(e) Lack of infrastructure around observability in general. Many of the issues above are by no means limited to compilation performance. For example, the lack of any testing and verification infrastructure for the metrics pipeline makes it almost impossible to track dependencies, where any innocent metric definition change or pipeline change could have huge downstream repercussions on monitoring and alerting. The present disclosure will address some of these pain points, with a focus on compilation performance issues, but many of the proposed solutions would apply to other areas of observability.

The following configurations can be considered for performance analyzer stored procedures which can be performed by the DCRM 128.

Goals. When investigating SQL performance problems, engineers use their custom-written queries and scripts, oftentimes spending time to rediscover solutions that were known beforehand by other engineers. The goal of the performance analyzer is to group the most common techniques for investigating single query performance issues. The output is a report which looks at the time taken by various parts of query processing, changes in data size, and the system load to summarize the most likely causes of the performance regression and to guide the investigation.

What can be checked. The stored procedure can be used in two ways. It can compare the execution for two query IDs (slow versus fast query), as the ones coming from compiler regression alerts. Or it can take just one query ID (the other one being null), in which case it reports the main contributors to the latency of the given query.

The logic implemented by the performance analyzer is based on checking the following pieces of information.

(a) Data size comparison: if both queries we are comparing scan a large table and there is a significant difference in the number of rows or scanned bytes from one query to another, we report the data size increase.

(b) Compilation time. From the compilation stopwatch we can collect the following information: increase in total compilation time from the fast to the slow query; compiler visitors that take a significant time and are much slower in the slow query compared to the same visitor in the fast one; IOEvents and sub-events that take a significant time and are much slower in the slow query compared to the same event in the fast one; and if the load on the GS instance where the slow query ran was higher than usual, its value is reported.

(c) Execution Feedback stats: the following issues are reported—cardinality misestimation, selectivity misestimation, and wrong build side selection in hash join.

Configuration parameters. The analysis performed by the procedure can be configured via parameters taken either from a configuration table or from a variant input argument.

If both arguments are present, the values in the variant argument override the values from the configuration table. The schema of the configuration table is (key varchar, value varchar).

The following functionalities for compilation performance regression detection can be performed by the DCRM 128.

Motivation. The compiler, as the extremely critical part of a query processor, is liable to performance regression, especially when more and more features are being added these days. However, regression in this area can be difficult to find beforehand with the current performance testing framework and can sometimes block pre-release stages. During the feature rollout process, these regressions also take non-trivial time and effort to narrow down the root cause and come up with a fix for mitigating customer issues shortly. More importantly, issues can be unknown due to no reporting/lack of comprehensive metrics and loggings for data observability.

To serve rapid development meanwhile assure stability in compilation performance, it is highly motivating that apart from existing Performance Canary Infrastructure, automatically detecting regressed compilation performance found during the rollout process can benefit Regression Analysis for culprits, as well as Blast Radius decision making.

Goals. Considering the high value of recurrent queries, this design aims to leverage offline Recurrent Query Infrastructure as the initial step, for exploring effective approaches to detecting compilation performance regression, as a replacement for retiring current solution in the long term. The following configuration goals can be considered:

(a) Identify required components and uniform procedure for the offline metric pipeline;
(b) Provide heuristic strategies for detecting regressed compilation performance at different granular levels.
(c) Support monitoring on recurrent queries to better understand compilation performance in a breakdown.

Data Availability. To support the application built on top, it is essential to guarantee correctness, comprehensiveness, and accuracy in collected metrics and stats of compilation. Since the offline information processing pipeline is less strict in latency but expected to have better coverage in regression detection, this section focuses on a uniform procedure and interfaces to incorporate data into offline infrastructure efficiently.

Add Data to Infrastructure. To include more data while conveniently altering tables and running tasks with less maintenance cost, two interfaces could be added to the recurrent_query_history view for internal use (e.g., using add_metric_from_job(agg_func, metric_name) and add_metric_from_stopwatch(agg_func, dimension, metric_name)).

Detection Strategy. Unlike new incidents/user errors, which can be simply inferred by checking counts and easily understood from signature/error messages, compilation performance regression has to be analyzed against history data per recurrent query. Given the improved data observability in offline infrastructure, this section looks into heuristic strategies for detecting regression at different levels.

General Compilation Performance. During preliminary triaging stages, the overall compilation performance can be used to quickly discern if any apparent regression happened, like a spike in compilation time/resource utilization.

Targeted Compilation Performance. Considering compensation between performance improvement and degradation, customers may have no recognition in compilation regression. The general metric is also coarse-grained if changes in performance are unobvious, making it essential to perform offline analysis from a broader perspective by considering compilation breakdowns.

In some embodiments, the following configurations can be used by the plan hashing 626 in connection with plan change detection.

Goals:
(a) Provide ways to identify unique query plans, identify queries with the same plans in production, and compare plans from different queries at various stages of the query optimization.
(b) Can be used for efficiently detecting query plan changes both in testing as well as for production queries. This can be applied during the rollout of query optimizer features.
(c) Plan hashing can be used for investigating plan stability issues and verifying the effectiveness of plan stability mechanisms.
(d) Besides top-level plan hashes, plan hashes can also be used for comparing and tracking common subplan fragments across customer workloads for relevant workload optimizations such as automatic materialized view creations.

Rolling Out Plan Changes. Plan changes are difficult to roll out. One reason for this is that there is no good way to easily detect plan changes both in tests and in production. With plan hashing, many of the existing testing infrastructures can be extended to support checking for plan changes easily. For example, an additional mode can be added to compare query plan hashes in regression testing infrastructures.

Plan hashing can be integrated with database testing to improve efficiency in detecting plan changes in production customer queries. With the absence of plan hashing information, database testing has to perform a large number of query executions for the same query to detect regressions when it comes to planning changes. Integrating with plan hashing will allow the performance of testing on a much larger number of customer queries for plan changes since query executions can be skipped for all queries with no plan changes.

Monitoring Plan Changes in Production. Once a plan change begins rollout in production, the relevant plan hashes can be monitored in production to gauge its impact and detect potential regressions. To achieve this, plan hashing information for production queries needs to be exported into a production analytical database to facilitate further analysis, regression detection, and alerting.

Besides during plan change rollouts, plan hashing can be used to analyze the plan stability of production systems in general. This can surface both unstable plans due to code changes as well as data changes and can be used to study the effectiveness of our plan stability mechanisms, reveal potential problems and generate improvement ideas.

Plan Difference Diagnostics. For two queries with different plans, computing plan hashing at different stages of query optimization allows for easy comparison of the plans at each stage and identifies the stage where the two plans start to differ. This can be integrated with automated tooling that allows us to narrow down the investigation target quickly.

Advanced Analysis. The above use cases mostly refer to scenarios where a check for exact plan matches is performed. However, there are many cases where different forms of plan hashes would become useful. In such cases, plan hashing needs to be extended from its strictest form into ones that would potentially allow more lenient matching depending on the search criteria. For these use cases, different levels of plan hashing can be defined depending on the purpose of the match.

Plan Hashing Levels. Depending on the use case, not all levels of plan hashes can be computed by default. For example, the physical plan hash used for recognizing plan changes can be computed for all production queries by default and exported to a production analytical database, whereas some more lenient types of hashing should only be enabled for individual performance testing experiments.

The plan hash implementation can be flexible to allow easy configuration (addition/removal) of certain information to be included in different levels. In the meantime, plan hashes at various levels should be efficiently computed such that computation can be reused within the same query compilation.

Physical Plan. The physical plan hash is the strictest form of plan hashing. Since the physical plan is the output of the query optimizer, this hash encapsulates the output of the optimizer. Not all the information passed down to the physical plan level should be represented in this plan hash. For example, the scanset information should be skipped when computing this hash.

Logical Plan. For plan change diagnostics, as well as many other types of investigations, using logical plans provides a lot more flexibility. The goal of the plan hashing framework should be to allow the creation of logical plan hashes at arbitrary points of optimization to summarize the plans at that point.

The logical plan hash computation may choose to skip information that is not relevant to the use case. For example, certain types of notes including Buffer, Projection, etc. can be skipped during logical plan hash computation. Certain investigations may only be interested in the shape of the plan or the overall join order, and in such cases, the information that goes into the plan hash can be simplified further.

Plan Fragments. As alluded to above, plan fragments hash can be useful for identifying common sub-plans that would become useful candidates for materialized view creation. Plan hashes for these fragments come naturally as part of the bottom-up plan hash computation. One challenge is identifying which sub-plans would be useful to track, especially when the plan is large and tracking every subplan fragment is infeasible. Besides materialized view recommendations, understanding common fragments also enhances understanding of the workload pattern and might open up other query optimization opportunities (e.g. background optimization).

Plan Hashing Computation. The plan hash will be computed on query plan node representations in a bottom-up fashion. Depending on the level of the hash, the information that goes into the hash could be flexible. The hash of a plan node will be computed from the plan hashes of its children along with specific information for the current node such as the node type, target objects/columns, join/group by keys, etc. The plan hash also includes information about the expressions at each node, where each expression/predicate has a corresponding hash. The hash might also explicitly exclude certain information such as constant values, scanset information, and distribution methods of links to allow more flexible matching. Due to the nature of the bottom-up computation, all sub-plan hashes are comparable as well.

Plan Hash Levels. Physical Plan Hash: This will be computed at a fixed point towards the end of query optimization, right before the query plan is ready to be converted into the runtime SDL format in code generation. The physical plan hash should include most information that eventually ends up in the SDL, including the RSO information, link information, expression information, etc. This hash will be computed by default and exported to testing.

Logical Plan Hash: The logical plan hash can be computed at different points during query optimization. This is intended to be a highly configurable form of hash that can be computed using various types of information at each plan node. The invocation of logical plan hashes will be coupled with the various action injection points of the Compilation Control framework, and this will eventually be controlled by that framework.

Plan Fragment Hash: the plan fragment hash will be available as the top-level plan hash is computed. The main challenge is with specifying which subset of plan fragment hashes to persist.

Hash Function. For plan change detection, it is important to make sure that the same plan generates the same hash, but it can be assumed there is the possibility that different plans produce the same hash. Hence, a bias towards evaluation performance is possible when it comes to the choice of hash functions. Both cryptographic and non-cryptographic hash functions can be used for this purpose, and the latter would be more performant. As such, there is no need to use the same cryptographic hash functions as the ones used for result hashing.

Expression Hashing. An important part of plan hashing is hashing of expressions involved in various plan nodes. In some aspects, the parse tree expression representation is used in query plan node representations. For hashing of expressions, the naive approach of hashing the string representation of the expression can be used. However, a more sophisticated approach that normalizes the expressions would be a lot more desirable, especially for workload optimization investigations. For example, for a normalized hash of expressions, we only need the following input: base object ids, column IDs, function names, argument positions/types, as well as the hash of the input expression.

Versioning. When the underlying implementation of the plan hash implementation changes, plan hashes are not comparable across different implementations. It is hence important to record this information so that we avoid recognizing plan hash differences in such cases as real plan changes. The version of the plan hash will be represented as a parameter that is embedded in the hash to properly reflect changes in the plan hash versions.

In some embodiments, the following configurations can be provided for regression diagnostics 612 and automated root cause diagnostics 434. In some embodiments, the configurations include parameter comparison functionality to find differences in default and non-default parameter settings directly in two arbitrary queries from arbitrary production deployments. Such functionality saves time and effort for further regression analysis on root causes and can be used as a component in a remote query re-execution end-to-end pipeline.

In some embodiments, the configurations include query parameter diagnostic tooling with the following functionalities:
 (a) Provide reliable parameter setting information for parameters that are set through all types of mechanisms, including partial-rollout parameters and A/B testing parameters.
 (b) Provide tooling for reliably comparing and returning parameter setting differences between two previously executed queries.

(c) Integrates the parameter comparison tooling with root cause parameter analysis, which can be part of the automated regression detection pipeline.

Parameter Capture. To provide reliable parameter diagnostic information for SQL queries, all parameter settings used during the query compilation can be captured. During compilation, parameters can be looked up from different levels. A common level for doing parameter lookups during query compilation is the statement level, but there are often other levels including user level, table level, etc. During parameter lookup, first, a check is performed on whether the parameter has been set explicitly at that specified level, and if not, the lookup continues searching the parent level until it finds one where the parameter is explicitly set; otherwise, the default value of the parameter is used.

For diagnosing parameter settings for a given SQL query, only parameters that were looked up during the query compilation can be captured, as opposed to the entire environment setting for that query. Within parameters that are looked up, there can be a configuration to explicitly keep track of the non-default parameters, since the default parameter settings will be the same for each release. As long as there is an accurate capture of the default parameter settings for each release, the non-default settings captured per query and default settings per release can be combined to obtain the full extent of parameter settings for any arbitrary query. An important caveat is to ensure there is no gap between the non-default parameters that are captured and the default parameter settings.

Default Parameters. Default parameter values could change across release versions, and it is important to capture the default parameter settings for each version. There are a few ways to capture default parameter settings per release:

(a) Online collection: for queries from recent releases, default parameter settings could be collected online directly from the same deployment and release version that the query originally ran from. This makes it easy to build useful diagnostic tooling that runs in Snowflake accounts of target deployments, which has access to query details that contain non-default parameter settings as well.

(b) Offline collection: A complementary approach is to collect this information offline and persist this in tables in a testing deployment. Orthogonal to the online collection, an offline collection of default parameter settings will be very useful as a historical record that can be used to figure out parameter settings for previous queries where the release version is no longer available in any deployment.

Non-Default Parameters. Non-default parameters can be set at different levels, and all relevant levels can be captured. For example, lookups for parameters that turn out with non-default values at the statement level can be captured. Levels that can be relevant for query compilation are those that refer to various objects, including tables, schemas, databases, warehouses, streams, tasks, pipes, etc.

Parameter Comparison Tooling. The following use cases can be configured:

(a) Display parameter settings for a single query. Sometimes the user wants to know all parameter settings for a given query. This functionality could be useful for understanding whether a particular parameter has been enabled for the query or monitoring for suspicious root cause parameters. This can be done online through a stored procedure.

(b) Comparing pairs of queries from the same deployment. Comparing parameter differences can be the first step in determining the cause of behavioral differences between identical queries, either across releases or within the same release. A stored procedure can be used to achieve this. This functionality can build on the single table parameter setting information from the use case above and simply add additional comparison logic to return the differences.

(c) Automatic Cause Parameter Detection. Various regression detection mechanisms that can surface two runs of identical or very similar queries that behave in significantly different ways (e.g., new incidents, performance regression, etc.) can be used. With the stored procedure mentioned above, an integrated pipeline that automatically detects parameter differences and drives the root cause analysis can be configured.

(d) Comparing queries from different deployments. For cases where we would like to reproduce an issue in pre-production or local deployments, parameter differences can be retrieved across different deployments and deployment types.

The following configurations can be provided for plan validation 630. In some embodiments, the plan validation 630 can include an invariant checker for parse trees to check that parse trees satisfy certain invariants that should always hold. The following is a list of proposed invariants. A good invariant should always be satisfied, and it would be considered a bug if it is not. In some embodiments, a background task can be created to trigger plan validation.

In some embodiments, the following configurations can be provided for the impact analysis and rollback decision 614 component.

Goals. The regression impact analysis component can be part of the rollout automation infrastructure. This component takes input from regression detection as well as root cause analysis components and synthesizes the information to determine the impact of the change, including blast radius, the severity of impact (e.g., type of regression, degree of a performance regression, etc.), and whether there are mitigations. This component can incorporate decision rules that synthesize the information and make decisions as to the action to take.

The following prerequisites and assumptions can be configured:

(a) Regression detection module registers regression into a table in a testing environment, with relevant query information.

(b) New features are rolled out with automated rollout parameters. In particular, the feature name is the same as the parameter name.

(c) Root cause analysis finds the root cause parameter and updates the registered regression table.

The following are assumptions on performance regression that can be considered:

(a) Performance improvements can cause performance regressions in existing queries and workloads.

(b) Certain categories of performance regressions caused by rolling out performance improvements do not have good short-term fixes (e.g., existing cardinality estimation issues exposed by the change).

(c) Rolling back performance improvements could cause perceived performance regressions in accounts where that improvement was previously enabled. Beyond a certain point, rolling back can be risky compared to other mitigation strategies.

(d) A rollout schedule compacted to a drown-out rollout process can be used, where the parameter could take different default values for a different subset of customers.

Figure 11:
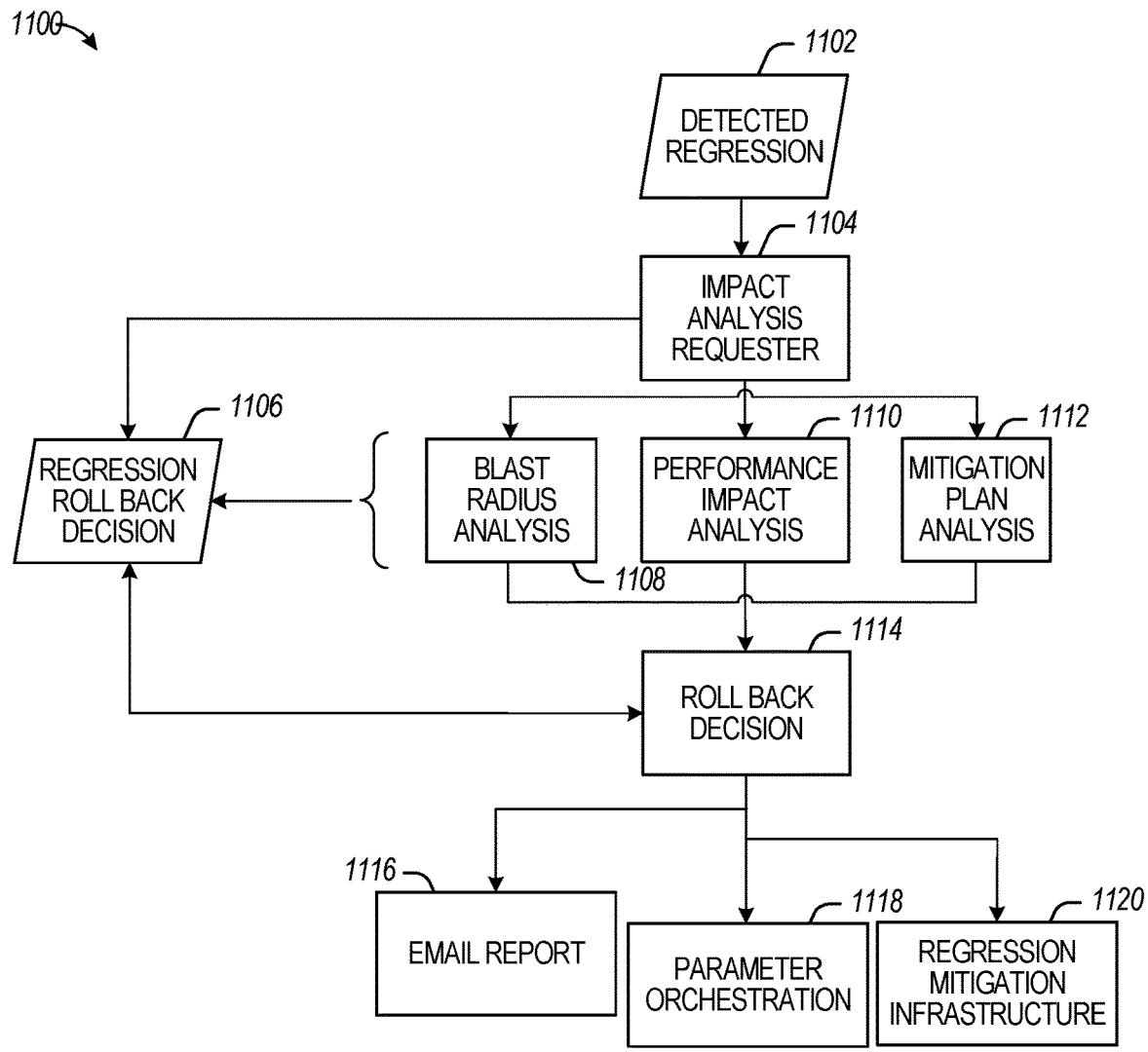
FIG. 11 is a flow diagram illustrating the operations of a database system in performing a method for regression impact analysis and decision-making in connection with the rollout of database changes, in accordance with some embodiments of the present disclosure.

The logical architecture of the impact analysis and rollback decision is illustrated in FIG. 11. FIG. 11 is a flow diagram illustrating the operations of a database system in performing method 1100 for regression impact analysis and decision-making in connection with the rollout of database changes, in accordance with some embodiments of the present disclosure.

Referring to FIG. 11, a table Detected Regression is configured at operation 1102. This table can be stored in a testing environment and can be used for registering all detected regression here. After a new regression is inserted into the table, the root cause analysis functionality asynchronously updates the root cause parameter of the new regression.

An impact analysis requester is configured at operation 1104. This can be a stored procedure that runs periodically and collects newly detected regression with found root cause analysis. Since root cause analysis and impact analysis both run asynchronously. Separate configurations can be provided on how these components run and what period of regressions they collect.

One option is to have the impact analysis requester run at the same frequency as the root cause analysis, collecting regressions from the former cycle. In some aspects, the impact analysis requester can execute with a lower frequency but it can still collect regressions that the root cause analysis has finished analyzing.

In some aspects, for each regression, the impact analysis requester calls blast radius analysis and mitigation plan analysis. The performance impact analysis can be called for performance regressions. A new row can be registered in table regression_roll_back_decision.

Blast radius analysis is performed at operation 1108. This can be configured as a stored procedure that calculates the blast radius of a regression. The following parameters can be considered—maximum blast radius and estimated blast radius.

The maximum blast radius includes all uses of the root cause feature, including queries where regression does not happen. It indicates the worst-case scenario for a regression. This metric may not be treated as the only metric because that would make features roll out inefficiently. Metrics that can be considered for maximum blast radius are the number of impacted customers and the number of impacted queries. These metrics can be calculated by joining the root cause parameter on usage tracking information where the automated rollout parameter is set to Applied. The log scale of numbers can be retrieved and output a linear combination of two metrics. In this regard, Blast Radius=a*log(# of impacted customers)+b*log(# of impacted queries).

The estimated blast radius analysis is done through incident analysis. The number of the same incidents caused by the root cause feature can be determined. This can be calculated by joining with incident history information on the error signature/source error signature.

Performance impact analysis is performed at operation 1110. This is a stored procedure that calculates a degree of performance regression. This module can analyze two metrics:

(a) Degree of performance degradation between regression query and previous queries.
(b) Degree of performance improvement between non-regression query and previous queries.

Performance improvement can be captured because many performance features would indirectly cause performance degradation in related features. A feature that causes performance regression in 1% of queries might be improving performance in 30% of queries. Capturing improvement could help in making rollback decisions that encourage performance features.

Alternative 1: collect performance metrics in regression detection and store information in detected_regression.

Alternative 2: rerun good and bad queries with a re-execution pipeline in the same environment and compare performance.

Mitigation plan analysis is performed at operation 1112, and regression rollback decision is performed at operation 1106.

A rollback decision is performed at operation 1114. This can be a stored procedure that takes input from the blast radius analysis, performance impact analysis, and mitigation plan analysis, and makes decisions on whether rollback should be performed of the feature causing regression (e.g., rollback on data/metadata corruption and wrong results).

After a decision is made, an email report can be communicated (at operation 1116) to support engineers. Such a report can include the following information: regression ID, regression type, error message/stack trace, rollback decision, blast radius, performance degradation (for performance regressions), performance improvement (for performance regressions), and possible mitigation plans.

The communication can further provide access to overriding rollback decisions. After the module outputs a rollback decision, there is an overriding period accepting override. The overridden decision would be stored in table roll_back_decision.

After the overriding period, the rollback decision module will trigger the next step based on the final decision. If a rollback decision is made, rollback can be triggered by calling the parameter orchestration module. If a non-rollback decision is made and a mitigation plan is found, mitigation can be triggered by calling the regression mitigation module. Parameter orchestration can be performed at operation 1118, and regression mitigation can be initiated at operation 1120.

In some embodiments, the following configurations can be provided for the query feature repository 620. The feature repository maintains a distinct set of features, as well as the usage/presence of each feature for each query that was executed in a database system. This effectively enables a feature vector that can be built for each query, which is in turn used as inputs to machine learning algorithms such as clustering and other classification tasks.

In some aspects, features maintained by the repository include both static as well as dynamic (runtime) features. Examples of static features include query constructs such as joins, group by, window functions, etc. It also includes the objects and columns accessed by the query. Dynamic features include runtime information such as compilation time, and execution time as well as a breakdown of resources used by the query, etc.

In some embodiments, the feature repository is the underlying infrastructure for more advanced capabilities such as workload/query classification, workload capture, sampling, production testing coverage, etc. For example, the feature repository can be used for training a classifier to determine the type of workload the query belongs to (e.g., whether it belongs to Analytical, Transactional, Data Pipeline, or Data Science type of workload). The queries can be clustered to find a representative set of queries within a workload, which can be used as input to test coverage tools, performance benchmarking, as well as workload tuning and optimization activities.

In some embodiments, the following functionalities can be configured for regression mitigation 616. Once a regression is detected, the rollout automation infrastructure aims to automatically mitigate the regression so that customers stop experiencing the regression while an investigation is underway. The regression mitigation mechanisms include various levels of retries for query failures including execution step-level retry and query-level retry to reduce the visibility of these failures to customers. Besides this, parameter control and mitigation could be applied at various levels (e.g., account, group, and deployment levels) which can be automatically determined based on the nature of the regression and the blast radius. For plan regressions, the rollout automation infrastructure can leverage plan stability infrastructure to mitigate bad plans and understand the blast radius.

Figure 12:
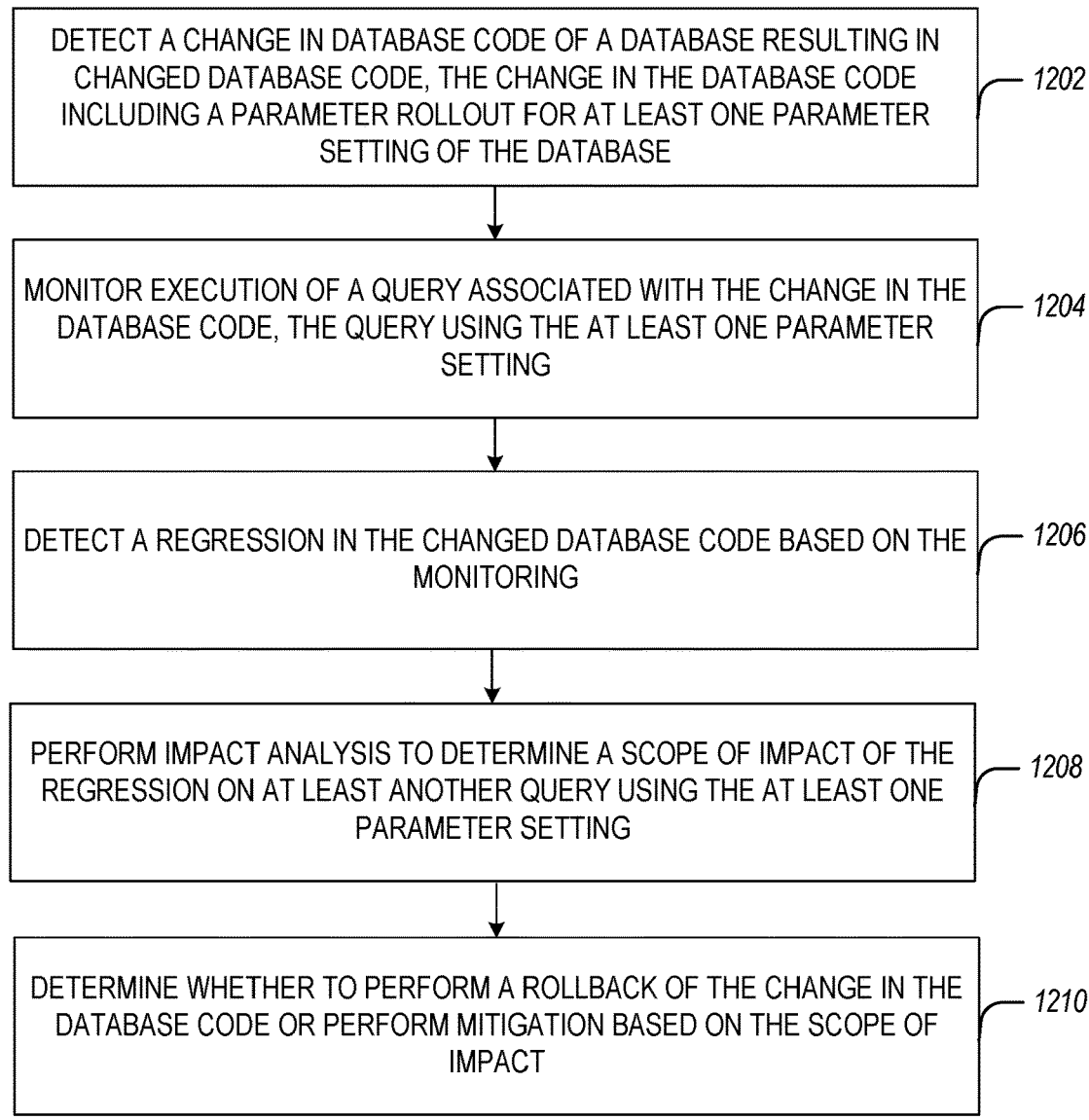
FIG. 12 is a flow diagram illustrating the operations of a database system in performing a method for configuring database changes, in accordance with some embodiments of the present disclosure.

FIG. 12 is a flow diagram illustrating the operations of a database system in performing method 1200 for configuring database changes, in accordance with some embodiments of the present disclosure. Method 1200 may be embodied in computer-readable instructions for execution by one or more hardware components (e.g., one or more processors) such that the operations of method 1200 (or any other method disclosed herein) may be performed by components of network-based database system 102, such as components of the compute service manager 108 (e.g., the DCRM 128) and/or the execution platform 110 (e.g., the infrastructure layer 130), where at least one of the components may be implemented as machine 1300 of FIG. 13. However, it shall be appreciated that method 1200 may be deployed on various other hardware configurations and is not intended to be limited to deployment within the network-based database system 102.

At operation 1202, a change in the database code of a database is detected, where the change results in a changed database code. The change in the database code can include a parameter rollout for at least one parameter setting of the database.

At operation 1204, the execution of a query associated with the change in the database code can be monitored. The query uses the at least one parameter setting.

At operation 1206, a regression in the changed database code is detected based on the monitoring.

At operation 1208, impact analysis is performed to determine a scope of impact of the regression on at least another query using the at least one parameter setting.

At operation 1210, a determination is made on whether to perform a rollback of the change or adopt other mitigation mechanisms such as plan stability in the database code based on the scope of impact.

Figure 13:
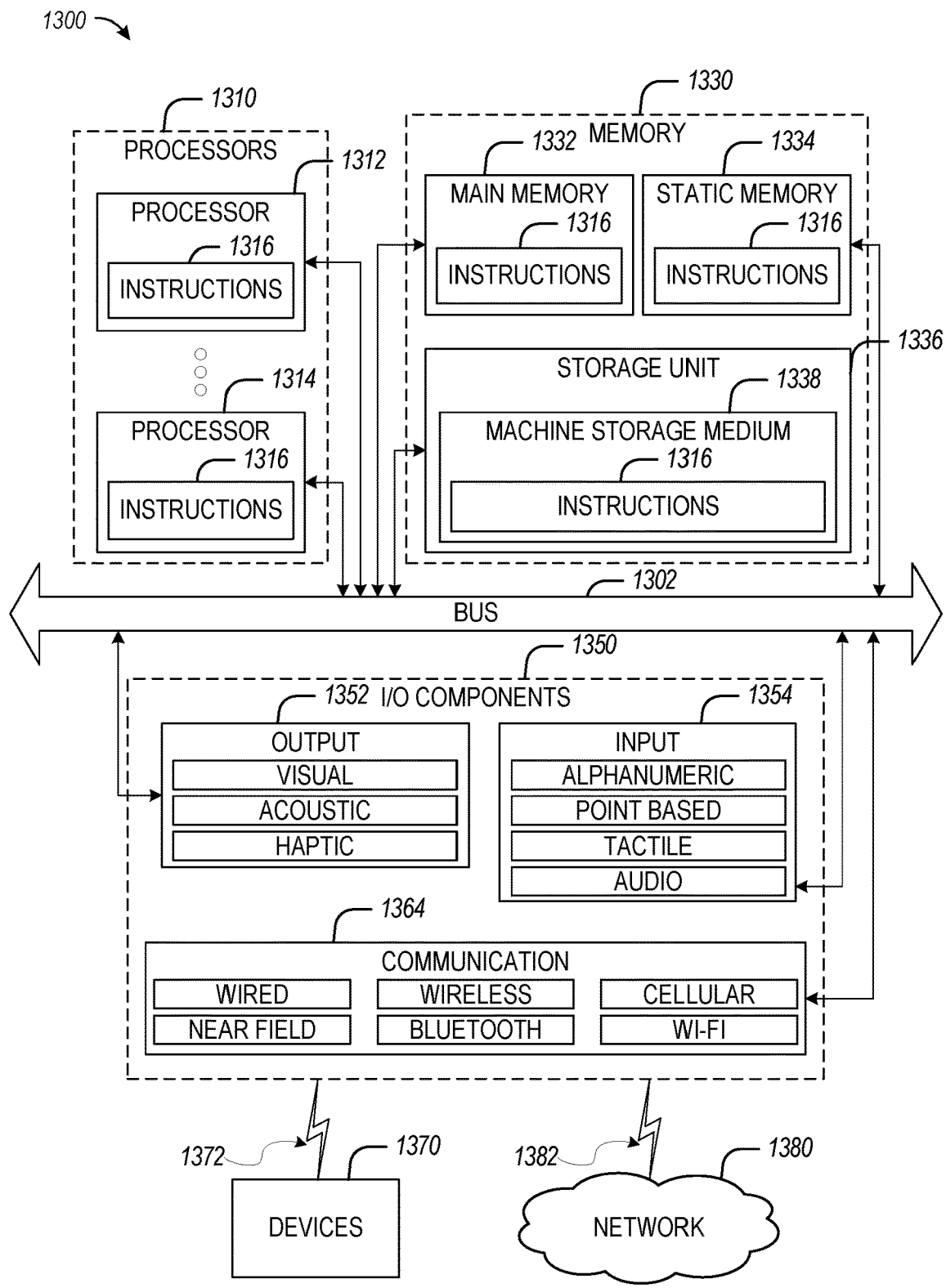
FIG. 13 illustrates a diagrammatic representation of a machine in the form of a computer system within which a set of instructions may be executed for causing the machine to perform any one or more of the methodologies discussed herein, in accordance with some embodiments of the present disclosure.

FIG. 13 illustrates a diagrammatic representation of machine 1300 in the form of a computer system within which a set of instructions may be executed for causing machine 1300 to perform any one or more of the methodologies discussed herein, according to an example embodiment. Specifically, FIG. 13 shows a diagrammatic representation of machine 1300 in the example form of a computer system, within which instructions 1316 (e.g., software, a program, an application, an applet, an app, or other executable code) for causing the machine 1300 to perform any one or more of the methodologies discussed herein may be executed. For example, instructions 1316 may cause machine 1300 to execute any one or more operations of method 1200 (or any other technique discussed herein, for example in connection with FIG. 4-FIG. 12). As another example, instructions 1316 may cause machine 1300 to implement one or more portions of the functionalities discussed herein. In this way, instructions 1316 may transform a general, non-programmed machine into a particular machine 1300 (e.g., the compute service manager 108 or a node in the execution platform 110) that is specially configured to carry out any one of the described and illustrated functions in the manner described herein. In yet another embodiment, instructions 1316 may configure the compute service manager 108 and/or a node in the execution platform 110 to carry out any one of the described and illustrated functions in the manner described herein.

In alternative embodiments, the machine 1300 operates as a standalone device or may be coupled (e.g., networked) to other machines. In a networked deployment, machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

Machine 1300 includes processors 1310, memory 1330, and input/output (I/O) components 1350 configured to communicate with each other such as via a bus 1302. In some example embodiments, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions 1316 contemporaneously. Although FIG. 13 shows multiple processors 1310, machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, all accessible to the processors 1310 such as via the bus 1302. The main memory 1332, the static memory 1334, and the storage unit 1336 store the instructions 1316 embodying any one or more of the methodologies or functions described herein. The instructions 1316 may also reside, completely or partially, within the main memory 1332, within the static memory 1334, within machine storage medium 1338 of the storage unit 1336, within at least one of the processors 1310 (e.g., within the processor's cache memory), or any suitable combination thereof, during execution thereof by the machine 1300.

The I/O components 1350 include components to receive input, provide output, produce output, transmit information, exchange information, capture measurements, and so on.

The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or another suitable device to interface with network 1380. In further examples, communication components 1364 may include wired communication components, wireless communication components, cellular communication components, and other communication components to provide communication via other modalities. The device 1370 may be another machine or any of a wide variety of peripheral devices (e.g., a peripheral device coupled via a universal serial bus (USB)). For example, as noted above, machine 1300 may correspond to any one of the compute service manager 108 or the execution platform 110, and device 1370 may include the client device 118 or any other computing device described herein as being in communication with the network-based database system 102 or the cloud storage platform 104.

The various memories (e.g., 1330, 1332, 1334, and/or memory of the processor(s) 1310 and/or the storage unit 1336) may store one or more sets of instructions 1316 and data structures (e.g., software) embodying or utilized by any one or more of the methodologies or functions described herein. These instructions 1316, when executed by the processor(s) 1310, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1380 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1380 or a portion of network 1380 may include a wireless or cellular network, and coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 may be transmitted or received over the network 1380 using a transmission medium via a network interface device (e.g., a network interface component included in the communication components 1364) and utilizing any one of several well-known transfer protocols (e.g., hypertext transfer protocol (HTTP)). Similarly, instructions 1316 may be transmitted or received using a transmission medium via coupling 1372 (e.g., a peer-to-peer coupling) to device 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: detecting a change in database code of a database resulting in changed database code, the change in the database code including a parameter rollout for at least one parameter setting of the database; monitoring the execution of a query (e.g., one or more of all the queries in production) associated with the change in the database code, the query using the at least one parameter setting; detecting a regression in the changed database code based on the monitoring; performing impact analysis to determine a scope (and severity) of impact of the regression on at least another query (or all associated queries) using the at least one parameter setting; and determining whether to perform a rollback of the change in the database code or perform mitigation (e.g., by using a mitigation mechanism such as a retry or plan stability) based on the scope of impact. In some aspects, the disclosed system is integrated into a network-based database system itself (e.g., as an integral part of the database system). In other words, the disclosed system can be configured to self-manage the state of rolling out of its changes, and such management is decoupled from the code version release. In some aspects, the disclosed processing associated with the system can be automated end-to-end, which enables higher scalability and throughput of the rollout, enforces standardization, and eliminates human mistakes.

In Example 2, the subject matter of Example 1 includes operations associated with detecting an incorrect result after execution of a data manipulation language (DML) statement associated with the query; and determining the regression is associated with data corruption based on the incorrect result.

In Example 3, the subject matter of Example 2 includes operations associated with detecting an inconsistency between metadata of the query before the execution of the DML statement and metadata of the query after the execution of the DML statement.

In Example 4, the subject matter of Example 3 includes operations associated with determining the regression is further associated with metadata corruption based on the inconsistency.

In Example 5, the subject matter of Examples 1-4 includes operations associated with determining a prior execution of the query has been completed without errors, the prior execution of the query completed before the change in the database code.

In Example 6, the subject matter of Example 5 includes operations associated with detecting the execution of the query results in an error; and determining the regression is associated with a new user error based on the prior execution completing without errors.

In Example 7, the subject matter of Examples 1-6 includes operations associated with determining a plurality of timing metrics associated with multiple stages of the execution of the query.

In Example 8, the subject matter of Example 7 includes subject matter where the plurality of timing metrics comprises latency and elapsed time for each of the multiple stages of the execution.

In Example 9, the subject matter of Examples 7-8 includes operations associated with determining the regression is a performance regression based on at least one of the plurality of timing metrics being below a pre-configured threshold.

In Example 10, the subject matter of Examples 1-9 includes operations associated with performing a blast radius analysis associated with the regression in the changed database code, the blast radius analysis is based at least on a number of additional queries affected by the regression; and determining whether to perform the rollback of the change in the database code further based on the blast radius analysis.

Example 11 is a method comprising: detecting, by at least one hardware processor, a change in database code of a database resulting in changed database code, the change in the database code including a parameter rollout for at least one parameter setting of the database; monitoring the execution of a query associated with the change in the database code, the query using the at least one parameter setting; detecting a regression in the changed database code based on the monitoring; performing impact analysis to determine a scope of impact of the regression on at least another query using the at least one parameter setting; and determining whether to perform a rollback of the change in the database code based on the scope of impact.

In Example 12, the subject matter of Example 11 includes, detecting an incorrect result after execution of a data manipulation language (DML) statement associated with the query; and determining the regression is associated with data corruption based on the incorrect result.

In Example 13, the subject matter of Example 12 includes, detecting an inconsistency between metadata of the query before the execution of the DML statement and metadata of the query after the execution of the DML statement.

In Example 14, the subject matter of Example 13 includes, determining the regression is further associated with metadata corruption based on the inconsistency.

In Example 15, the subject matter of Examples 11-14 includes, determining a prior execution of the query has completed without errors and the prior execution of the query completed before the change in the database code.

In Example 16, the subject matter of Example 15 includes, detecting the execution of the query results in an error; and determining the regression is associated with a new user error based on the prior execution completing without errors.

In Example 17, the subject matter of Examples 11-16 includes, determining a plurality of timing metrics associated with multiple stages of the execution of the query.

In Example 18, the subject matter of Example 17 includes subject matter where the plurality of timing metrics comprises latency and elapsed time for each of the multiple stages of the execution.

In Example 19, the subject matter of Examples 17-18 includes, determining the regression is a performance regression based on at least one of the plurality of timing metrics being below a pre-configured threshold.

In Example 20, the subject matter of Examples 11-19 includes, performing a blast radius analysis associated with the regression in the changed database code, the blast radius analysis based at least on a number of additional queries affected by the regression; and determining whether to perform the rollback of the change in the database code further based on the blast radius analysis.

Example 21 is a computer-storage medium comprising instructions that, when executed by one or more processors of a machine, configure the machine to perform operations comprising: detecting a change in database code of a database resulting in changed database code, the change in the database code including a parameter rollout for at least one parameter setting of the database; monitoring the execution of a query associated with the change in the database code, the query using the at least one parameter setting; detecting a regression in the changed database code based on the monitoring; performing impact analysis to determine a scope of impact of the regression on at least another query using the at least one parameter setting; and determining whether to perform a rollback of the change in the database code based on the scope of impact.

In Example 22, the subject matter of Example 21 includes operations associated with detecting an incorrect result after execution of a data manipulation language (DML) statement associated with the query; and determining the regression is associated with data corruption based on the incorrect result.

In Example 23, the subject matter of Example 22 includes operations associated with detecting an inconsistency between metadata of the query before the execution of the DML statement and metadata of the query after the execution of the DML statement.

In Example 24, the subject matter of Example 23 includes operations associated with determining the regression is further associated with metadata corruption based on the inconsistency.

In Example 25, the subject matter of Examples 21-24 includes operations associated with determining a prior execution of the query has completed without errors, the prior execution of the query completed before the change in the database code.

In Example 26, the subject matter of Example 25 includes operations associated with detecting the execution of the query results in an error; and determining the regression is associated with a new user error based on the prior execution completing without errors.

In Example 27, the subject matter of Examples 21-26 includes operations associated with determining a plurality of timing metrics associated with multiple stages of the execution of the query.

In Example 28, the subject matter of Example 27 includes subject matter where the plurality of timing metrics comprises latency and elapsed time for each of the multiple stages of the execution.

In Example 29, the subject matter of Examples 27-28 includes operations associated with determining the regression is a performance regression based on at least one of the plurality of timing metrics being below a pre-configured threshold.

In Example 30, the subject matter of Examples 21-29 includes operations associated with performing a blast radius analysis associated with the regression in the changed database code, the blast radius analysis is based at least on a number of additional queries affected by the regression; and determining whether to perform the rollback of the change in the database code further based on the blast radius analysis.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to perform operations comprising:
decoding a notification of a changed database code of a database;
executing a query responsive to the notification, the query indicating a data processing command and a data object in the database;
detecting a regression in the changed database code based on multiple regression testing operations applied to the data processing command and the data object;
performing analysis of the regression to detect a rollout parameter of a plurality of rollout parameters as a root cause of the regression, the plurality of rollout parameters associated with the changed database code; and
determining whether to perform a mitigation action for the regression based on the rollout parameter.

2. The system of claim 1, the operations further comprising:
performing a first regression testing operation of the multiple regression testing operations based on regression detection associated with the data processing command, the first regression testing operation being at an individual query level.

3. The system of claim 2, the operations further comprising:
performing a second regression testing operation of the multiple regression testing operations based on regression detection associated with the data object, the second regression testing operation being at an object level.

4. The system of claim 3, wherein the query is a recurrent query and the operations further comprising:
performing a third regression testing operation of the multiple regression testing operations based on regression detection associated with the recurrent query, the third regression testing operation being at a recurrent query level, at a workload level, or at a system level.

5. The system of claim 1, the operations further comprising:
encoding a notification of the detected regression for communication to a developer workflow node, the developer workflow node associated with implementing a change in database code of the database resulting in the changed database code.

6. The system of claim 5, the operations further comprising:
decoding analysis information of the detected regression received from the developer workflow node responsive to the notification of the detected regression; and
detecting the rollout parameter of the plurality of rollout parameters as the root cause of the regression at least based on the analysis information.

7. The system of claim 1, the operations further comprising:
performing impact analysis to determine a scope of impact of the regression on at least another query using the rollout parameter, the impact analysis based at least on the root cause.

8. The system of claim 7, the operations further comprising:
performing blast radius analysis to determine a blast radius of the regression; and
determining whether to perform the mitigation action for the regression based at least on the scope of impact of the regression and the blast radius of the regression.

9. The system of claim 1, the operations further comprising:
detecting an incorrect result after execution of a data manipulation language (DML) statement associated with the query; and
determining the regression is associated with data corruption based on the incorrect result.

10. The system of claim 9, the operations further comprising:
detecting an inconsistency between metadata of the query before the execution of the DML statement and metadata of the query after the execution of the DML statement; and
determining the regression is further associated with metadata corruption based on the inconsistency.

11. A method comprising:
decoding, by at least one hardware processor, a notification of a changed database code of a database;
executing a query responsive to the notification, the query indicating a data processing command and a data object in the database;
detecting a regression in the changed database code based on multiple regression testing operations applied to the data processing command and the data object;
performing analysis of the regression to detect a rollout parameter of a plurality of rollout parameters as a root cause of the regression, the plurality of rollout parameters associated with the changed database code; and
determining whether to perform a mitigation action for the regression based on the rollout parameter.

12. The method of claim 11, further comprising:
performing a first regression testing operation of the multiple regression testing operations based on regression detection associated with the data processing command, the first regression testing operation being at an individual query level.

13. The method of claim 12, further comprising:
performing a second regression testing operation of the multiple regression testing operations based on regression detection associated with the data object, the second regression testing operation being at an object level.

14. The method of claim 13, wherein the query is a recurrent query and the method further comprising:
performing a third regression testing operation of the multiple regression testing operations based on regression detection associated with the recurrent query, the third regression testing operation being at a recurrent query level, at a workload level, or at a system level.

15. The method of claim 11, further comprising:
encoding a notification of the detected regression for communication to a developer workflow node, the developer workflow node associated with implementing a change in database code of the database resulting in the changed database code.

16. The method of claim 15, further comprising:
decoding analysis information of the detected regression received from the developer workflow node responsive to the notification of the detected regression; and
detecting the rollout parameter of the plurality of rollout parameters as the root cause of the regression at least based on the analysis information.

17. The method of claim 11, further comprising:
performing impact analysis to determine a scope of impact of the regression on at least another query using the rollout parameter, the impact analysis based at least on the root cause.

18. The method of claim 17, further comprising:
performing blast radius analysis to determine a blast radius of the regression; and
determining whether to perform the mitigation action for the regression based at least on the scope of impact of the regression and the blast radius of the regression.

19. The method of claim 11, further comprising:
detecting an incorrect result after execution of a data manipulation language (DML) statement associated with the query; and
determining the regression is associated with data corruption based on the incorrect result.

20. The method of claim 19, further comprising:
detecting an inconsistency between metadata of the query before the execution of the DML statement and metadata of the query after the execution of the DML statement; and
determining the regression is further associated with metadata corruption based on the inconsistency.

21. A computer-storage medium comprising instructions that, when executed by one or more processors of a machine, configure the machine to perform operations comprising:
decoding a notification of a changed database code of a database;
executing a query responsive to the notification, the query indicating a data processing command and a data object in the database;
detecting a regression in the changed database code based on multiple regression testing operations applied to the data processing command and the data object;
performing analysis of the regression to detect a rollout parameter of a plurality of rollout parameters as a root cause of the regression, the plurality of rollout parameters associated with the changed database code; and
determining whether to perform a mitigation action for the regression based on the rollout parameter.

22. The computer-storage medium of claim 21, the operations further comprising:
performing a first regression testing operation of the multiple regression testing operations based on regression detection associated with the data processing command, the first regression testing operation being at an individual query level.

23. The computer-storage medium of claim 22, the operations further comprising:
performing a second regression testing operation of the multiple regression testing operations based on regression detection associated with the data object, the second regression testing operation being at an object level.

24. The computer-storage medium of claim 23, wherein the query is a recurrent query and the operations further comprising:
performing a third regression testing operation of the multiple regression testing operations based on regression detection associated with the recurrent query, the third regression testing operation being at a recurrent query level, at a workload level, or at a system level.

25. The computer-storage medium of claim 21, the operations further comprising:
encoding a notification of the detected regression for communication to a developer workflow node, the developer workflow node associated with implementing a change in database code of the database resulting in the changed database code.

26. The computer-storage medium of claim 25, the operations further comprising:
decoding analysis information of the detected regression received from the developer workflow node responsive to the notification of the detected regression; and
detecting the rollout parameter of the plurality of rollout parameters as the root cause of the regression at least based on the analysis information.

27. The computer-storage medium of claim 21, the operations further comprising:
performing impact analysis to determine a scope of impact of the regression on at least another query using the rollout parameter, the impact analysis based at least on the root cause.

28. The computer-storage medium of claim 27, the operations further comprising:
performing blast radius analysis to determine a blast radius of the regression; and
determining whether to perform the mitigation action for the regression based at least on the scope of impact of the regression and the blast radius of the regression.

29. The computer-storage medium of claim 21, the operations further comprising:
detecting an incorrect result after execution of a data manipulation language (DML) statement associated with the query; and
determining the regression is associated with data corruption based on the incorrect result.

30. The computer-storage medium of claim 29, the operations further comprising:
detecting an inconsistency between metadata of the query before the execution of the DML statement and metadata of the query after the execution of the DML statement; and
determining the regression is further associated with metadata corruption based on the inconsistency.

* * * * *